United States Patent
Matsuda et al.

(10) Patent No.: US 12,238,785 B2
(45) Date of Patent: *Feb. 25, 2025

(54) COMMUNICATION DEVICE AND COMMUNICATION METHOD

(71) Applicant: Sony Group Corporation, Tokyo (JP)

(72) Inventors: Hiroki Matsuda, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,537

(22) Filed: Feb. 12, 2024

(65) Prior Publication Data

US 2024/0188146 A1    Jun. 6, 2024

Related U.S. Application Data

(63) Continuation of application No. 17/892,125, filed on Aug. 22, 2022, now Pat. No. 11,924,889, which is a
(Continued)

(30) Foreign Application Priority Data

Mar. 29, 2019 (JP) ................. 2019-068878

(51) Int. Cl.
*H04W 74/08*  (2024.01)
*H04W 74/00*  (2009.01)
*H04W 74/0833*  (2024.01)

(52) U.S. Cl.
CPC ..... *H04W 74/0841* (2013.01); *H04W 74/002* (2013.01); *H04W 74/0891* (2013.01)

(58) Field of Classification Search
CPC ... H04W 56/00; H04W 74/08; H04W 74/002; H04W 74/0841; H04W 74/0891; H04W 74/00

See application file for complete search history.

(56) References Cited

U.S. PATENT DOCUMENTS 10,880,895 B2 * 12/2020 Gordaychik .......... H04W 52/18
2015/0359003 A1 * 12/2015 Kim .................. H04W 74/0833
370/336

(Continued)

FOREIGN PATENT DOCUMENTS

CN          1622499 A      6/2005
CN        101854729 A     10/2010
(Continued)

OTHER PUBLICATIONS

International Search Report and Written Opinion mailed on Apr. 28, 2020, received for PCT Application No. PCT/JP2020/004767 Filed on Feb. 7, 2020, 17 Pages.
(Continued)

*Primary Examiner* — Nathan S Taylor

(74) *Attorney, Agent, or Firm* — XSENSUS LLP

(57) ABSTRACT

Provided are a communication device and a communication method capable of further improving the quality between radio links in a communication system in which a base station device and the communication device communicate with each other. A communication device according to the present disclosure includes a receiver and a transmitter. The receiver receives a synchronization signal transmitted from a base station device. The transmitter transmits a physical random access channel including a feature capable of uniquely identifying the synchronization signal received by a receiver and/or a PRACH resource to the base station device.

18 Claims, 16 Drawing Sheets

Related U.S. Application Data continuation of application No. 17/057,110, filed as application No. PCT/JP2020/004767 on Feb. 7, 2020, now Pat. No. 11,464,052.

(56) References Cited

U.S. PATENT DOCUMENTS

| | | | |
|---|---|---|---|
| 2017/0215207 A1 | 7/2017 | Yi et al. | |
| 2018/0241464 A1 | 8/2018 | Michaels | |
| 2020/0059877 A1* | 2/2020 | Zhang | H04W 52/04 |
| 2020/0314892 A1* | 10/2020 | Wang | H04W 74/006 |
| 2020/0314912 A1* | 10/2020 | Wang | H04W 16/28 |
| 2021/0119698 A1* | 4/2021 | Atungsiri | H04B 7/2041 |
| 2021/0297923 A1* | 9/2021 | Wei | H04W 64/003 |
| 2021/0329518 A1* | 10/2021 | Sharma | H04W 36/08 |
| 2021/0385675 A1* | 12/2021 | Määttänen et al. | H04W 76/28 |
| 2021/0399797 A1* | 12/2021 | Khan | H04W 36/085 |
| 2022/0007267 A1* | 1/2022 | Maattanen | H04W 8/26 |
| 2022/0021444 A1* | 1/2022 | Wei | H04B 7/18508 |
| 2022/0030532 A1* | 1/2022 | Hajir | H04B 7/18513 |
| 2022/0117003 A1* | 4/2022 | Shin | H04W 72/1263 |

FOREIGN PATENT DOCUMENTS

| | | |
|---|---|---|
| CN | 106465401 A | 2/2017 |
| EP | 3451553 A2 | 3/2019 |
| EP | 3700257 A1 | 8/2020 |
| WO | 02/39622 A1 | 5/2002 |
| WO | 2011/068358 A2 | 6/2011 |
| WO | 2017/130989 A1 | 8/2017 |
| WO | 2018/195679 A1 | 11/2018 |
| WO | 2018/203673 A1 | 11/2018 |
| WO | 2020/009741 A1 | 1/2020 |
| WO | 2020/163610 A1 | 8/2020 |

OTHER PUBLICATIONS

Ericsson, "On adapting random access procedures for NTN", 3GPP TSG-RAN WG1 Meeting No. 96, R1-1902903, Athens, Greece, Feb. 25-Mar. 1, 2019, pp. 1-3.

NTT DOCOMO Inc., "Discussion on remaining details on RACH procedure", 3GPP TSG RAN WG1 Meeting NR#3, R1-1716074, Nagoya, Japan, Sep. 18-21, 2017, 8 pages.

Samsung, "2 Step RA: MsgA Aspects", 3GPP TSG-RAN2 105bis, R2-1903112, Xian, China, Apr. 8-Apr. 12, 2019, 6 pages.

Huawei et al., "Overview of NTN", 3GPP TSG RAN WG1 Meeting No. 96, R1-1903195, Athens, Greece, Feb. 25-Mar. 1, 2019, 5 pages.

Thales, "Study on solutions for NR to support non-terrestrial networks (NTN)", 3GPP TSG RAN Meeting No. 82, RP-182880 Revision of RP-181370, 1598, 2444, 2844, Sorrento, Italy, Dec. 10-13, 2018, 6 pages.

Samsung, "Corrections on PRACH procedure", 3GPP Draft; R1-1806705, 3rd Generation Partnership Project (3GPP), Mobile Competence Centre; 650, Route Des Lucioles; F-06921 Sophia-Antipolis Cedex; France vol. RAN WG1, No. Busan, Korea: May 21, 2018-May 25, 2018 May 20, 2018 (May 20, 2018). XP051441907, Retrieved from the Internet: URL:http.//www.3gpp.org/ftp/Meetings%5F3GPP%5FSYNC/RAN1/Docs/ [retrieved on May 20, 2018].

Ericsson, "On random access for NTN", 3GPP TSG-RAN WG2 #104. Spokane, US, Nov. 12-16, 2018, Tdoc R2-1817765, pp. 1-4.

Interdigital Inc., "Considerations on Random Access for Non-Terrestrial Networks", 3GPP TSG RAN WG1 Meeting #92, Athens, Greece, Feb. 26-Mar. 2, 2018, R1-1802632, pp. 1-4.

\* cited by examiner

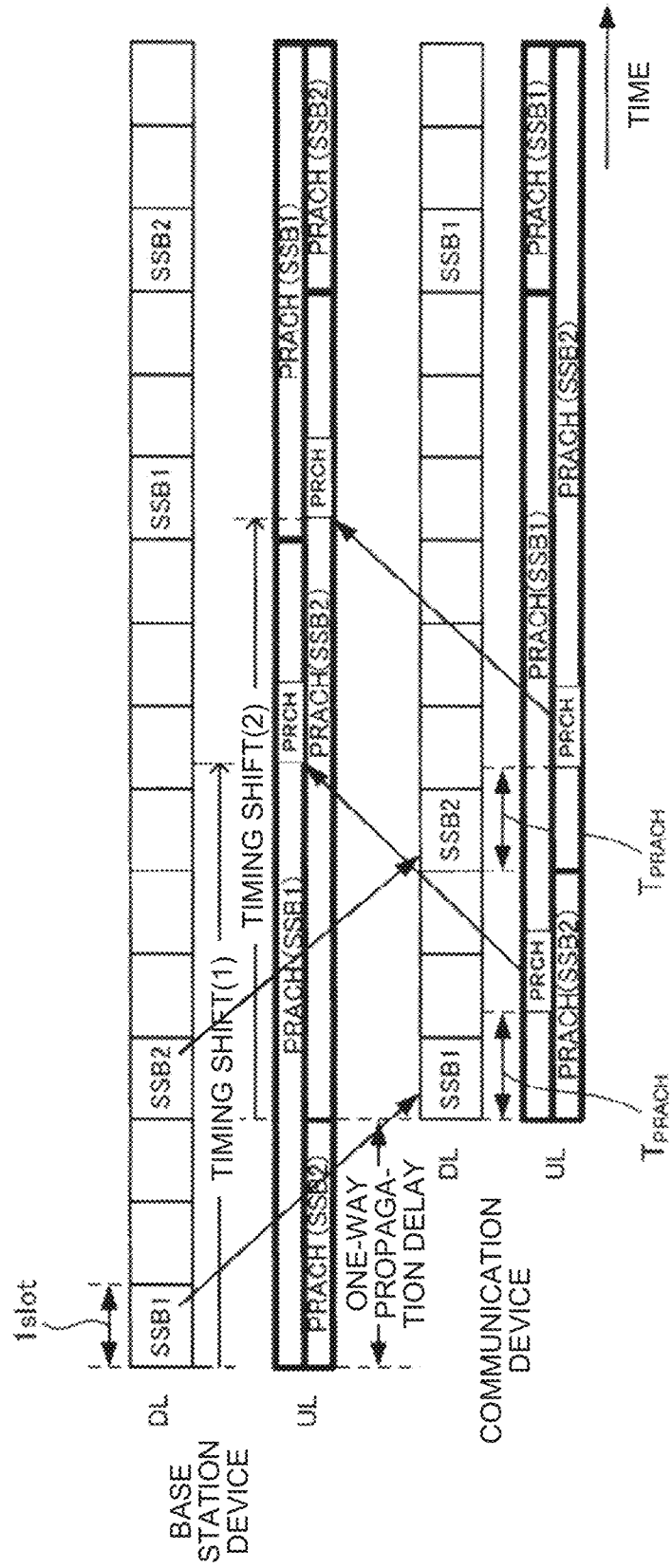

COMMUNICATION DEVICE AND COMMUNICATION METHOD

CROSS-REFERENCE TO RELATED APPLICATIONS

The present application is a continuation of U.S. application Ser. No. 17/892,125, filed Aug. 22, 2022, which is a continuation of U.S. application Ser. No. 17/057,110, filed Nov. 20, 2020 (now U.S. Pat. No. 11,464,052), which is based on PCT filing PCT/JP2020/004767, filed Feb. 7, 2020, which claims priority to JP 2019-068878, filed Mar. 29, 2019, the entire contents of each are incorporated herein by reference.

FIELD

The present disclosure relates to a communication device and a communication method.

BACKGROUND

Mobile communication using radio access technology such as cellular communication technology is known. In such radio access technology, the switching is performed between radio base station devices, which are connection destinations of a communication device, (hereinafter simply referred to as base station devices or base stations) with the movement of the communication device such as a cellular phone. In addition, for example, not only terrestrial stations installed on the ground but also non-terrestrial stations in the sky, such as artificial satellites, have been studied as base stations. In the communication device, not only wireless communication via a terrestrial station connected to a terrestrial station but also wireless communication via a non-terrestrial station connected to a non-terrestrial station has been studied.

CITATION LIST

Non Patent Literature

Non Patent Literature 1: RP-182880, Thales, "Study on solutions for NR to support non-terrestrial networks (NTN)", 3GPP TSG RAN Meeting #82, Sorrento, Italy, December, 2018.

SUMMARY

Technical Problem

However, the wireless communication performed by the communication device with the non-terrestrial station has a larger propagation delay than the wireless communication with the terrestrial station. Therefore, when performing wireless communication with the communication device on the ground, it is difficult for the non-terrestrial station to accurately calculate the propagation delay, which may deteriorate the quality between radio links.

Therefore, the present disclosure proposes a communication device and a communication method capable of further improving the quality between radio links in a communication system in which a base station device and the communication device communicate with each other.

Solution to Problem

According to the present disclosure, a communication device includes a receiver and a transmitter. A receiver receives synchronization signals transmitted from a base station device. A transmitter transmits, to the base station device, physical random access channels (PRACHs) including features capable of uniquely identifying the synchronization signals received by the receiver and/or PRACH resources.

BRIEF DESCRIPTION OF DRAWINGS

FIG. 17 is an explanatory diagram of a third communication method according to the present disclosure.

DESCRIPTION OF EMBODIMENTS

Figure 1:
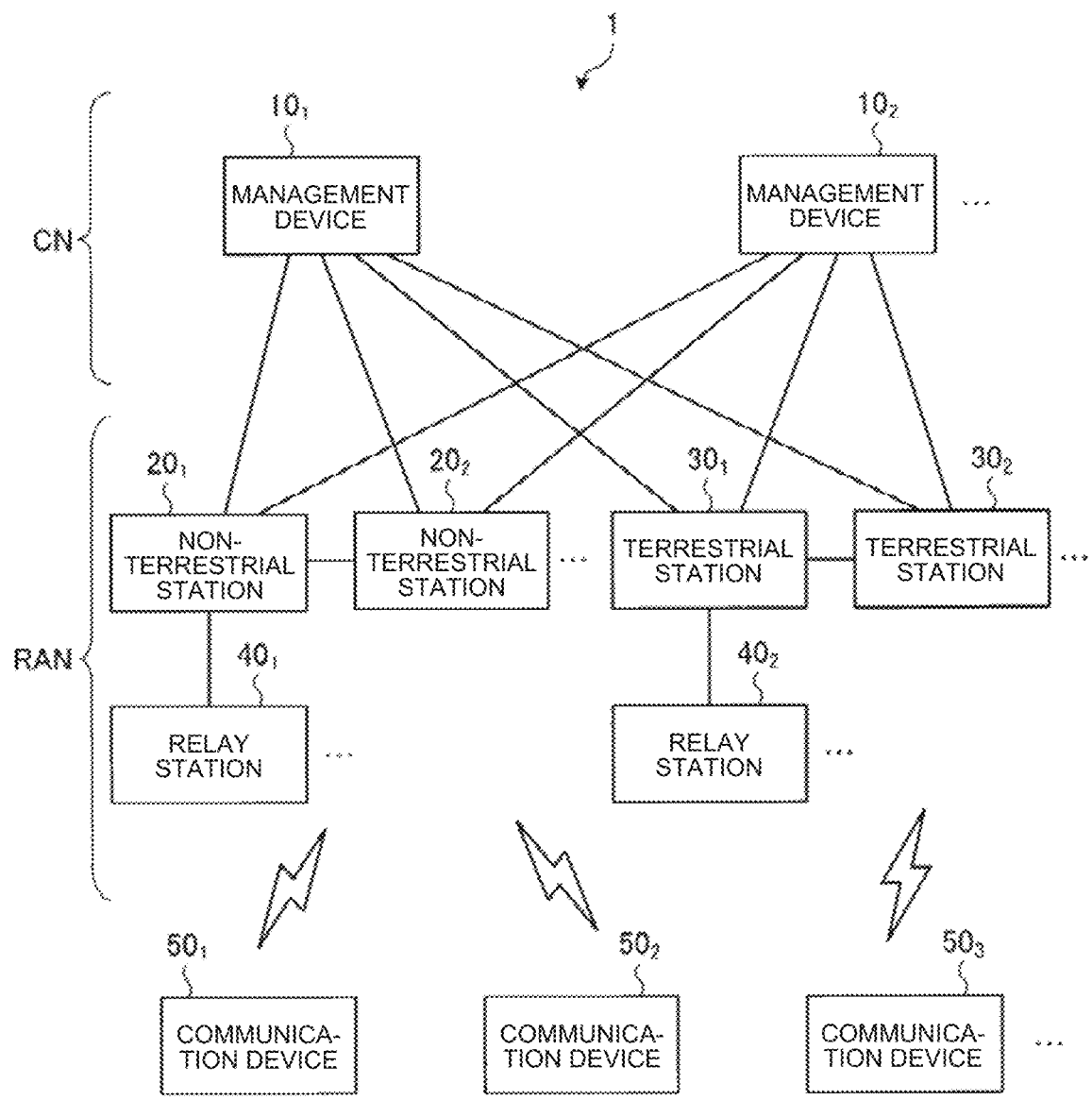
FIG. 1 is a diagram illustrating a configuration example of a communication system according to an embodiment of the present disclosure.

Embodiments of the present disclosure will be described below in detail with reference to the drawings. In each of the following embodiments, the same parts are denoted by the same reference symbols, and a repetitive description thereof will be omitted.

In addition, in this specification and the drawings, a plurality of components having substantially the same or similar functional configuration may be distinguished from each other by the same reference numeral followed by different numerals. For example, a plurality of components having substantially the same functional configuration is distinguished, like communication devices $50_1$, $50_2$, and $50_3$, as necessary. However, in a case where there is no need to particularly distinguish each of a plurality of components having substantially the same functional configuration, a same reference numeral alone will be attached. For example, the communication devices $50_1$, $50_2$, and $50_3$ are simply referred to as a communication device 50 unless it is not particularly necessary to distinguish them.

The present disclosure will be described in the following item order.

1. Introduction
2. Embodiments
2-1. Overall Configuration of Communication System
2-2. Configuration of Management Device
2-3. Configuration of Base Station
2-4. Configuration of Relay Station
2-5. Configuration of Communication Device
2-6. Initial Connection Process
2-7. First Communication Method
2-8. Second Communication Method
2-9. Third Communication Method
2-10. Effects
3. Modifications
3-1. Modification Regarding System Configuration
3-2. Other Modifications
4. Conclusion

1. INTRODUCTION

Radio access technologies such as long-term evolution (LTE) and new radio (NR) have been studied by the 3rd generation partnership project (3GPP). LTE and NR are types of cellular communication technologies and enable mobile communication of terminal devices by arranging a plurality of areas covered by a base station in a cell form. Moreover, the term of "LTE" as used herein includes LTE-advanced (LTE-A), LTE-advanced pro (LTE-A Pro), and evolved-universal terrestrial radio access (EUTRA). In addition, the term of "NR" as used herein includes new radio access technology (NRAT) and further-EUTRA (FEUTRA).

NR is the next-generation (fifth generation) radio access technology (RAT) of LTE. NR is the radio access technology capable of supporting various use cases including enhanced mobile broadband (eMBB), massive machine-type communications (mMTC), and ultra-reliable and low-latency communications (URLLC). NR is considered to build a technical framework that meets usage scenarios, requirements, deployment scenarios, or the like in these use cases.

Furthermore, in NR, studies on non-terrestrial network (NTN) have begun due to growing demands for wide-area coverage, connection stability, or the like. In the non-terrestrial network, the wireless network is planned to be provided for the terminal device via a base station other than a terrestrial station, such as satellite stations or aircraft stations. The base station other than the terrestrial stations is called a non-terrestrial station or a non-terrestrial base station. The wireless network provided by the terrestrial station is called a terrestrial network (TN). The use of the same radio access scheme for both terrestrial network and non-terrestrial network enables the integrated operations of the terrestrial network and the non-terrestrial network.

Moreover, in embodiments of the present disclosure, the terrestrial station (also referred to as a terrestrial base station) refers to a base station (including a relay station) installed on the ground. The term "ground" refers to not only the ground (land), but also the ground in the broad sense including underground, over-water, and under-water.

2. EMBODIMENTS

Hereinafter, a communication system 1 according to the present embodiment will be described. The communication system 1 includes a non-terrestrial station and provides wireless communication using a non-terrestrial network for a communication device. Note that the non-terrestrial network provided in the communication system 1 is not limited to wireless networks using the radio access scheme specified by NR. The non-terrestrial network included in the communication system 1 can be wireless networks of the radio access scheme other than NR, such as LTE, wideband code division multiple access (W-CDMA), and code division multiple access 2000 (cdma2000).

Note that the following description is given on the assumption that the concept of a base station (hereinafter also referred to as a base station device) includes a relay station (hereinafter also referred to as a relay device). In addition, the concept of the base station includes not only a structure equipped with functions of the base station but also a device installed in the structure. The structure is, for example, buildings such as tower buildings, houses, steel towers, railway station facilities, airport facilities, harbor facilities, and stadiums. Note that the concept of the structure includes not only buildings but also non-building structures such as tunnels, bridges, dams, fences, and steel columns, or also includes facilities such as cranes, gates, and windmills. In addition, the concept of the structure includes not only structures on the ground (land) or structures under the ground but also structures on the water such as piers and mega-floats or structures underwater such as ocean observation facilities.

Further, the base station can be a base station configured to be movable. For example, the base station can be a device installed in a moving body or the moving body itself. The moving body can be a mobile terminal such as smartphones, a moving body that moves on the ground (land) (e.g., a vehicle such as automobiles, buses, trucks, trains, and linear motor cars), or a moving body that moves under (e.g., in a tunnel) the ground (e.g., a subway). In addition, the moving body can be a moving object that moves on water (e.g., a ship such as passenger ships, cargo ships, and hovercrafts), or a moving body that moves underwater (e.g., a submersible ship such as submersible vessels, submarines, and unmanned submarines). In addition, the moving body can be a moving object that moves in the atmosphere (e.g., an aircraft such as airplanes, airships, and drones), or a space moving body that moves outside the atmosphere (e.g., artificial celestial bodies such as artificial satellites, spacecraft, space stations, and space probes).

Moreover, the LTE base station is sometimes referred to as evolved Node B (eNodeB) or eNB. In addition, the NR base station is sometimes referred to as gNodeB or gNB. In addition, in LTE and NR, terminal device (also referred to as a mobile station, mobile station equipment, or a terminal) is sometimes referred to as user equipment (UE). Moreover, the terminal device is a type of communication device and is also referred to as a mobile station, mobile station equipment, or a terminal. In an embodiment of the present disclosure, the concept of a communication device includes not only portable terminal device such as mobile terminal but also a device installed in, for example, a structure or a moving body. In addition, the concept of a communication device includes not only terminal device but also a base station and a relay station.

<2-1. Overall Configuration of Communication System>

FIG. 1 is a diagram illustrating an exemplary configuration of the communication system 1 according to the embodiment of the present disclosure. The communication system 1 includes: a management device 10, a non-terrestrial base station (hereinafter, simply referred to as a non-terrestrial station) 20, a terrestrial base station (hereinafter, simply referred to as a terrestrial station) 30, a relay device (hereinafter, simply referred to as a relay station) 40, and a communication device 50. The communication system 1 provides a user with a wireless network that allows mobile communication, by operating each of wireless communication devices constituting the communication system 1 in cooperation with each other. The wireless communication device is a device having a wireless communication function, and corresponds to the non-terrestrial station 20, the terrestrial station 30, the relay station 40, and the communication device 50 in the example of FIG. 1.

The communication system 1 may include a plurality of the management devices 10, the non-terrestrial stations 20, the terrestrial stations 30, the relay stations 40, and the communication devices 50. In the example of FIG. 1, the communication system 1 includes management devices $10_1$, $10_2$, and the like as the management device 10. In addition, the communication system 1 includes non-terrestrial stations $20_1$, $20_2$, and the like as the non-terrestrial station 20, and terrestrial stations $30_1$, $30_2$, and the like as the terrestrial station 30. In addition, the communication system 1 includes relay stations $40_1$, $40_2$, and the like as the relay station 40 and includes communication devices $50_1$, $50_2$, $50_3$, or the like as the communication device 50.

The management device 10 is a device that manages a wireless network. For example, the management device 10 is a device that functions as a mobility management entity (MME) or an access and mobility management function (AMF). The management device 10 constitutes a core network (CN). The core network (CN) is, for example, an evolved packet core (EPC) or a 5G core network (5GC). The management device 10 is connected to each of the plurality of non-terrestrial stations 20 and the plurality of terrestrial stations 30. The management device 10 manages communication between the non-terrestrial station 20 and the terrestrial station 30.

The non-terrestrial station 20 is a base station that wirelessly communicates with the communication device 50. In the example of FIG. 1, the non-terrestrial station $20_1$ is connected to the relay station $40_1$ and is capable of performing wireless communication with the communication device 50 via the relay station $40_1$. In the present embodiment, the non-terrestrial station 20 is a base station capable of floating in the air or space. For example, the non-terrestrial station 20 is a non-terrestrial station device such as an aircraft station and a satellite station.

The aircraft station is, for example, a wireless communication device capable of floating in the atmosphere such as an aircraft. The aircraft station may be, for example, a device mounted on an aircraft or the like, or the aircraft itself. Note that the concept of the aircraft includes not only heavy aircrafts such as airplanes and gliders but also light aircrafts such as balloons and airships In addition, the concept of the aircraft includes rotorcrafts, such as helicopters and autogyros, in addition to the heavy aircrafts and light aircrafts. Note that the aircraft station (or the aircraft on which the aircraft station is mounted) can be an unmanned aerial vehicle such as drones. Moreover, the concept of the unmanned aerial vehicles also includes unmanned aircraft systems (UAS) and tethered unmanned aerial systems (tethered UAS). In addition, the concept of the unmanned aerial vehicles includes lighter-than-air (LTA) UAS and heavier-than-air (HTA) UAS. In addition, the concept of the unmanned aerial vehicles also includes high-altitude UAS platforms (HAPs).

The satellite station is a wireless communication device capable of floating outside the atmosphere. The satellite station may be a device mounted on a space vehicle such as an artificial satellite or may be the space vehicle itself. A satellite serving as the satellite station may be any of a low earth orbit (LEO) satellite, a medium earth orbit (MEO) satellite, a geostationary earth orbit (GEO) satellite, and a highly elliptical orbit (HEO) satellite. The satellite station can understandably be a device mounted on the low earth orbit satellite, medium earth orbit satellite, geostationary earth orbit satellite, or highly elliptical orbit satellite.

The terrestrial station 30 is a base station that wirelessly communicates with the communication device 50. In the example of FIG. 1, the terrestrial station $30_1$ is connected to the relay station $40_2$ and is capable of performing wireless communication with the communication device 50 via the relay station $40_2$. The terrestrial station 30 may be a base station arranged in a structure on the ground or a base station installed in a moving body that moves on the ground. For example, the terrestrial station 30 is an antenna installed in a structure such as a building and a signal processing device connected to the antenna. It is a matter of course that the terrestrial station 30 may be a structure or a moving body itself.

The relay station 40 is a device that functions as a relay station for the base station. The relay station 40 is a type of base station. The relay station 40 relays communication between the non-terrestrial station 20 and the communication device 50 or communication between the terrestrial station 30 and the communication device 50. The relay station 40 may be a terrestrial station or a non-terrestrial station. The relay station 40 forms a radio access network RAN together with the non-terrestrial station 20 and the terrestrial station 30.

The communication device 50 is, for example, a mobile phone, a smart device (smartphone or tablet), a personal digital assistant (PDA), or a personal computer. In addition, the communication device 50 may be a machine-to-machine (M2M) device or an Internet of things (IOT) device. In addition, the communication device 50 may be a wireless communication device installed in a moving body or the moving body itself. Note that the communication device 50 may be a relay station that relays satellite communication or a base station that receives satellite communication. The communication device 50 is compatible with both the terrestrial network and the non-terrestrial network. Thus, the communication device 50 is capable of communicating with not only a terrestrial station device such as the terrestrial station 30 but also a non-terrestrial station device such as the non-terrestrial station 20.

Figure 2:
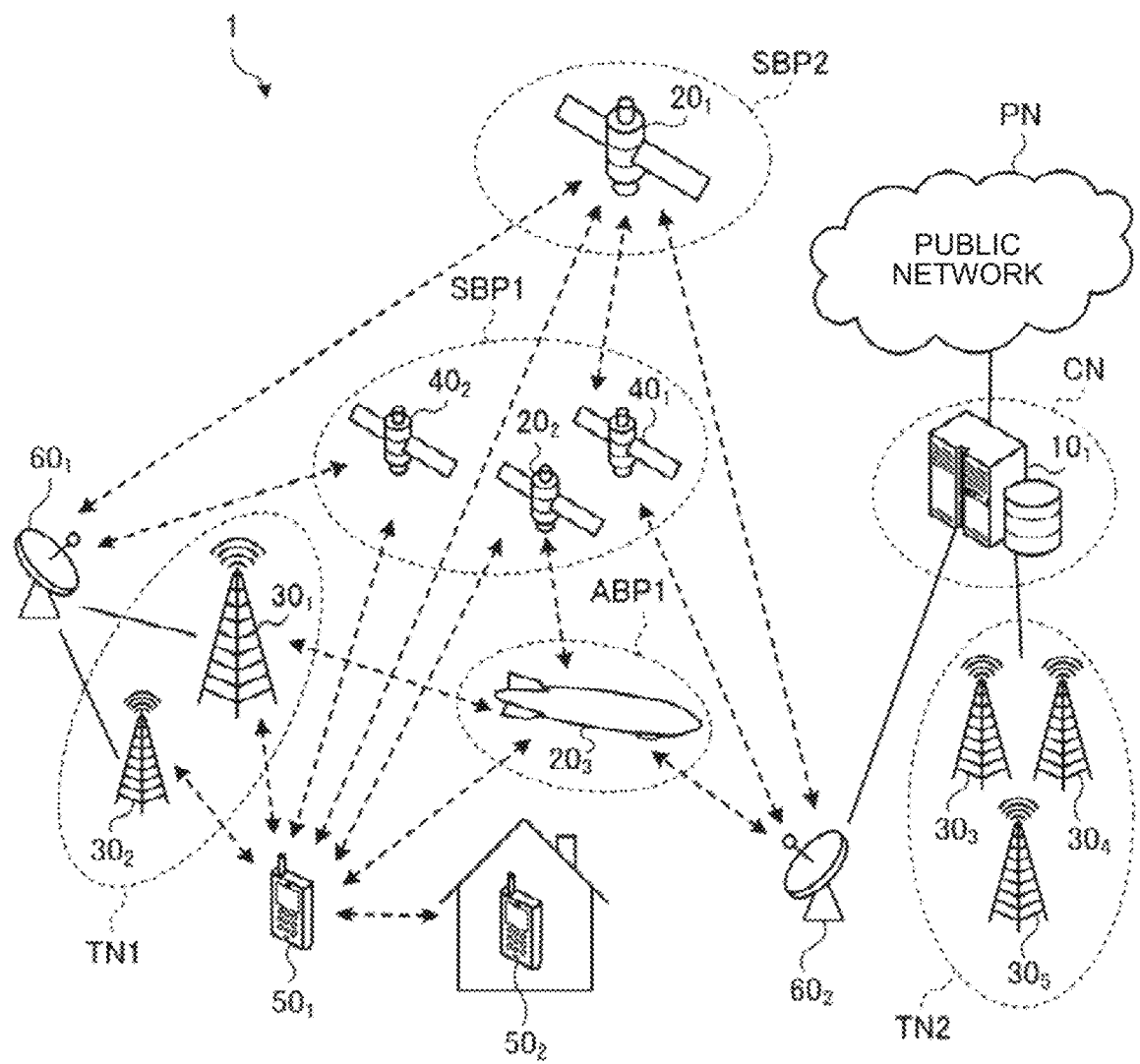
FIG. 2 is a diagram illustrating an example of a wireless network provided by the communication system.

FIG. 2 is a diagram illustrating an example of the wireless network provided by the communication system 1. The non-terrestrial station 20 and the terrestrial station 30 respectively form cells. A cell is an area where wireless communication is covered by a base station. The cell constituted by the non-terrestrial station 20 and the terrestrial station 30 may be any of a macro cell, a micro cell, a femto cell, and a small cell. Moreover, the communication system 1 may be configured such that a single base station manages a plurality of cells or a plurality of base stations manage a single cell.

In the example of FIG. 2, the terrestrial stations $30_1$ and $30_2$ constitute a terrestrial network TN1, and the terrestrial stations $30_3$, $30_4$, and $30_5$ constitute a terrestrial network TN2. The terrestrial network TN1 and the terrestrial network TN2 are, for example, terrestrial networks operated by a wireless communication provider such as a telephone company. The terrestrial network TN1 and the terrestrial network TN2 may be operated by different wireless communication providers or may be operated by the same wireless communication provider. It is also possible to regard the terrestrial network TN1 and the terrestrial network TN2 as one terrestrial network.

The terrestrial network TN1 and the terrestrial network TN2 are connected individually to a core network. In the example of FIG. 2, the terrestrial station 30 that constitutes the terrestrial network TN2 is connected to the core network CN constituted by the management device $10_1$ and the like. The core network CN is EPC if the radio access scheme of the terrestrial network TN2 is LTE. In addition, the core network CN is 5GC if the radio access scheme of the terrestrial network TN2 is NR. It is a matter of course that the core network CN is not limited to EPC or 5GC, and may be a core network using other radio access schemes. Note that the terrestrial network TN1 is not connected to the core network in the example of FIG. 2, but the terrestrial network TN1 may be connected to the core network CN. In addition, the terrestrial network TN1 may be connected to a core network (not illustrated) different from the core network CN.

The core network CN is provided with a gateway device, an inter-gateway switch, or the like, and is connected to a public network PN via the gateway device. The public network PN is, for example, a public data network such as the Internet, a regional IP network, a telephone network (such as a mobile telephone network and a fixed telephone network). The gateway device is, for example, a server device connected to the Internet, a regional IP network, or the like. The inter-gateway switch is, for example, a switch connected to a telephone network of a telephone company. The management device $10_1$ may have a function as a gateway device or an inter-gateway switch.

The non-terrestrial station 20 and the relay station 40 illustrated in FIG. 2 are both non-terrestrial station devices such as satellite stations and aircraft stations. A group of satellite stations (or a single satellite station) constituting the non-terrestrial network is called a spaceborne platform. In addition, a group of aircraft stations (or a single aircraft station) constituting the non-terrestrial network is called an airborne platform. In the example of FIG. 2, the non-terrestrial station $20_2$, the relay station $40_1$, and the relay station $40_2$ constitute a spaceborne platform SBP1, and the non-terrestrial station $20_1$ constitutes a spaceborne platform SBP2. In addition, the non-terrestrial station $20_3$ constitutes an airborne platform ABP1.

The communication device 50 can communicate with both the terrestrial station 30 and the non-terrestrial station 20. In the example of FIG. 2, the communication device $50_1$ can communicate with the terrestrial station 30 that constitutes the terrestrial network TN1. In addition, the communication device $50_1$ can communicate with the non-terrestrial station 20 that constitutes the spaceborne platforms SBP1 and SBP2. In addition, the communication device $50_1$ can also communicate with the non-terrestrial station 20 that constitutes the airborne platform ABP1. Note that the communication device $50_1$ may be capable of directly communicating with another communication device 50 (the communication device $50_2$ in the example of FIG. 2).

The non-terrestrial station 20 is connected to the terrestrial network or the core network via a relay station 60. The non-terrestrial stations 20 constituting the spaceborne platforms SBP1 and SBP2 are connected to the terrestrial network TN1 via a relay station $60_1$. In addition, the non-terrestrial stations 20 constituting the spaceborne platforms SBP1 and SBP2 and the airborne platform ABP1 are connected to the core network CN via a relay station $60_2$. Note that the non-terrestrial stations 20 can directly communicate with the other non-terrestrial stations 20 without the intervention of the relay station 60.

The relay station 60 is, for example, an aviation station or an earth station. An aviation station is a radio station installed on the ground or a moving body that moves on the ground to communicate with an aircraft station. In addition, the earth station is a radio station located on the earth (including the air) to communicate with a satellite station (space station). The earth station may be a large earth station or a small earth station such as a very-small-aperture terminal (VSAT). Note that the earth station may be a VSAT control earth station (also referred to as a parent station or HUB station) or a VSAT earth station (also referred to as a child station). In addition, the earth station may be a radio station installed in a moving body that moves on the ground. Examples of the earth station mounted on a ship include earth stations on board vessels (ESV). In addition, the earth station may include an aircraft earth station, which is installed in an aircraft (including a helicopter) and communicates with a satellite station. In addition, the earth station may include an aviation earth station, which is installed in a moving body that moves on the ground and communicates with an aircraft earth station via a satellite station. Moreover, the relay station 60 may be a portable and movable radio station that communicates with a satellite station or an aircraft station. The relay station 60 can be considered as a part of the communication system 1.

Figure 3:
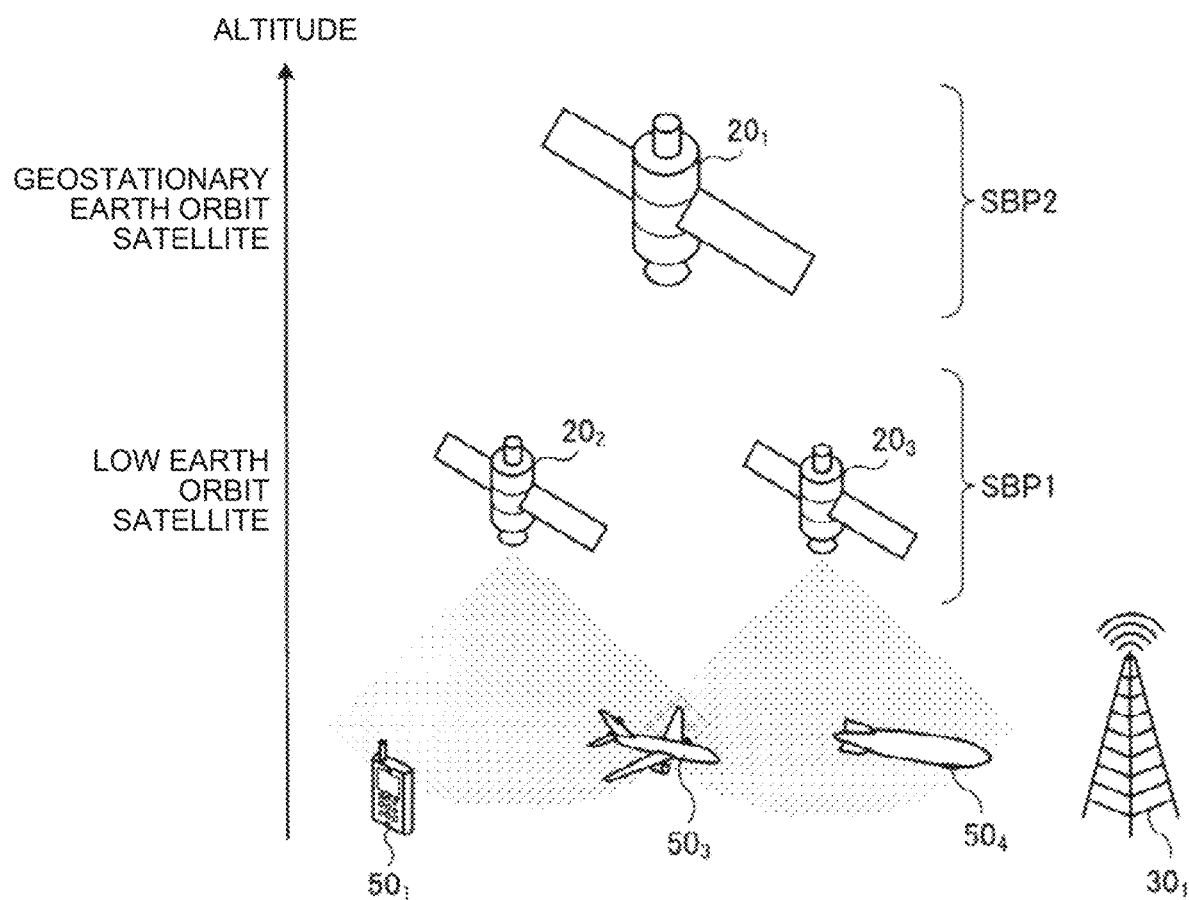
FIG. 3 is a diagram illustrating an overview of satellite communication provided by the communication system.

The respective devices constituting the spaceborne platforms SBP1 and SBP2 perform satellite communication with the communication device 50. The satellite communication refers to wireless communication between a satellite station and the communication device 50. FIG. 3 is a diagram illustrating an overview of the satellite communication provided by the communication system 1. The satellite station is mainly divided into a geostationary earth orbit satellite station and a low earth orbit satellite station.

The geostationary earth orbit satellite station is located at an altitude of approximately 35,786 km and revolves around the earth at the same speed as the earth's rotation speed. In the example of FIG. 3, the non-terrestrial station $20_1$ that constitutes the spaceborne platform SBP2 is a geostationary earth orbit satellite station. The geostationary earth orbit satellite station has a relative velocity of approximately zero with the communication device 50 on the ground and appears stationary when observed from the communication device 50 on the ground. The non-terrestrial station $20_1$ performs satellite communication with the communication devices $50_1$, $50_3$, $50_4$, and the like located on the earth.

A low earth orbit satellite station is a satellite station that orbits at a lower altitude than a geostationary earth orbit satellite station or a medium orbit satellite station. The low earth orbit satellite station is, for example, a satellite station located between altitudes of 500 km and 2000 km. In the example of FIG. 3, the non-terrestrial stations $20_2$ and $20_3$ that constitute the spaceborne platform SBP1 are low earth orbit satellite stations. Note that FIG. 3 illustrates only two non-terrestrial stations $20_2$ and $20_3$ as satellite stations that constitute the spaceborne platform SBP1. The satellite station that constitutes the spaceborne platform SBP1, however, has two or more (for example, tens to thousands) non-terrestrial stations 20, which practically constitute a low earth orbit satellite constellation. The low earth orbit satellite station has a relative speed with respect to the communication device 50 on the ground unlike the geostationary earth orbit satellite station and appears to be moving when observing from the communication device 50 on the ground. The non-terrestrial stations $20_2$ and $20_3$ constitute individually a cell and perform satellite communication with the communication devices $50_1$, $50_2$, $50_3$, and the like located on the earth.

Figure 4:
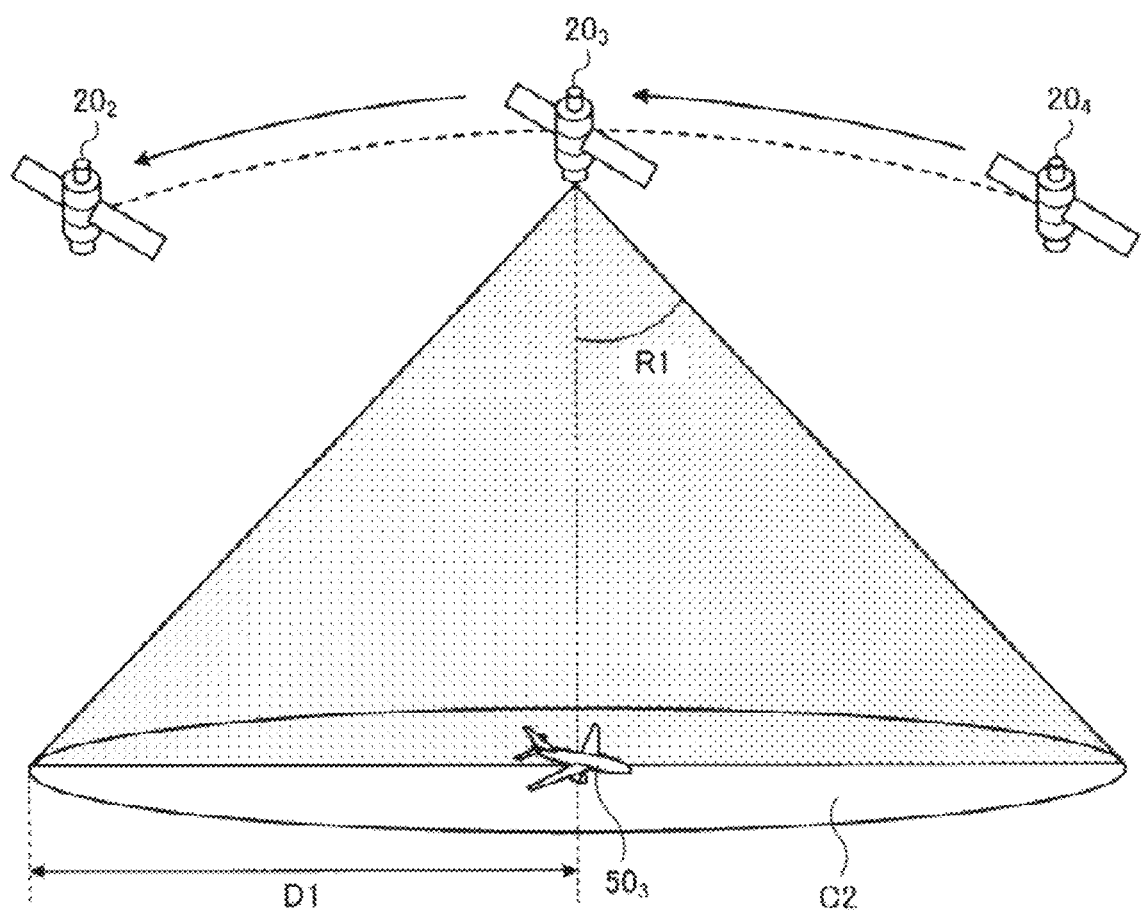
FIG. 4 is a diagram illustrating an example of a cell formed by a satellite station.

FIG. 4 is a diagram illustrating an example of a cell formed by a satellite station. FIG. 4 illustrates a cell C2 formed by the non-terrestrial station $20_3$, which is the low earth orbit satellite station. The satellite station that orbits a low earth orbit communicates with the communication device 50 on the ground with a predetermined directivity on the ground. For example, an angle R1 illustrated in FIG. 4 is 40°. In the case of FIG. 4, a radius D1 of the cell C2 formed by the non-terrestrial station $20_3$ is, for example, 1000 km. The low earth orbit satellite station moves at a constant speed. In the case where the low earth orbit satellite station is difficult to provide satellite communication to the terrestrial communication device 50, the subsequent low earth orbit satellite station provides satellite communication. In the case of the example in FIG. 4, when it is difficult for the non-terrestrial station $20_3$ to provide satellite communication to the terrestrial communication device 50, the subsequent non-terrestrial station 204 provides satellite communication. Note that the values of the angle R1 and the radius D1 described above are merely examples and are not limited thereto.

As described above, the communication device 50 can perform wireless communication using the non-terrestrial network. In addition, the non-terrestrial station 20 and the relay station 40 of the communication system 1 constitute the non-terrestrial network. As a result, the communication system 1 can extend the service even to the communication device 50 located in the area that is hardly covered by the terrestrial network. For example, the communication system 1 is capable of providing public safety communication and critical communication for the communication device 50 such as Internet of things (IoT) devices and machine-type communications (MTC) devices. In addition, the use of the non-terrestrial network improves service reliability and recovery, and thus, the communication system 1 can reduce the vulnerability of the service to a physical attack or a natural disaster. In addition, the communication system 1 can implement service connection to aircraft terminal devices such as passengers of airplanes and drones and service connection to mobile terminal devices such as ships and trains. In addition, the communication system 1 can implement the A/V content, group communication, IoT-based broadcast services, software download services, high-performance multicast services such as emergency messages, high-performance broadcast services, and the like. Furthermore, the communication system 1 can support traffic offload between the terrestrial network and the non-terrestrial network. For the implementation described above, it is desirable that the non-terrestrial network provided by the communication system 1 be operationally integrated with the terrestrial network provided by the communication system 1 in the upper layer. In addition, it is desirable that the non-terrestrial network provided by the communication system 1 have a common radio access scheme with the terrestrial network provided by the communication system 1.

Next, configurations of the respective devices constituting the communication system 1 according to the present embodiment will be described in detail.

<2-2. Configuration of Management Device>

The management device 10 is a device that manages a wireless network. For example, the management device 10 is a device that manages communication between the non-terrestrial station 20 and the terrestrial station 30. If the core network is EPC, the management device 10 is, for example, a device having a function as a mobility management entity (MME). In addition, if the core network is 5GC, the management device 10 is, for example, a device having a function as an access and mobility management function (AMF). The management device 10 may have a gateway function. For example, if the core network is EPC, the management device 10 may have a function as a serving-gateway (S-GW) or a packet data network gateway (P-GW). In addition, if the core network is 5GC, the management device 10 may have a function as a user plane function (UPF). Note that the management device 10 is not necessarily a device that constitutes the core network. For example, if the core network is a W-CDMA or cdma2000 core network, the management device 10 may be a device that functions as a radio network controller (RNC).

Figure 5:
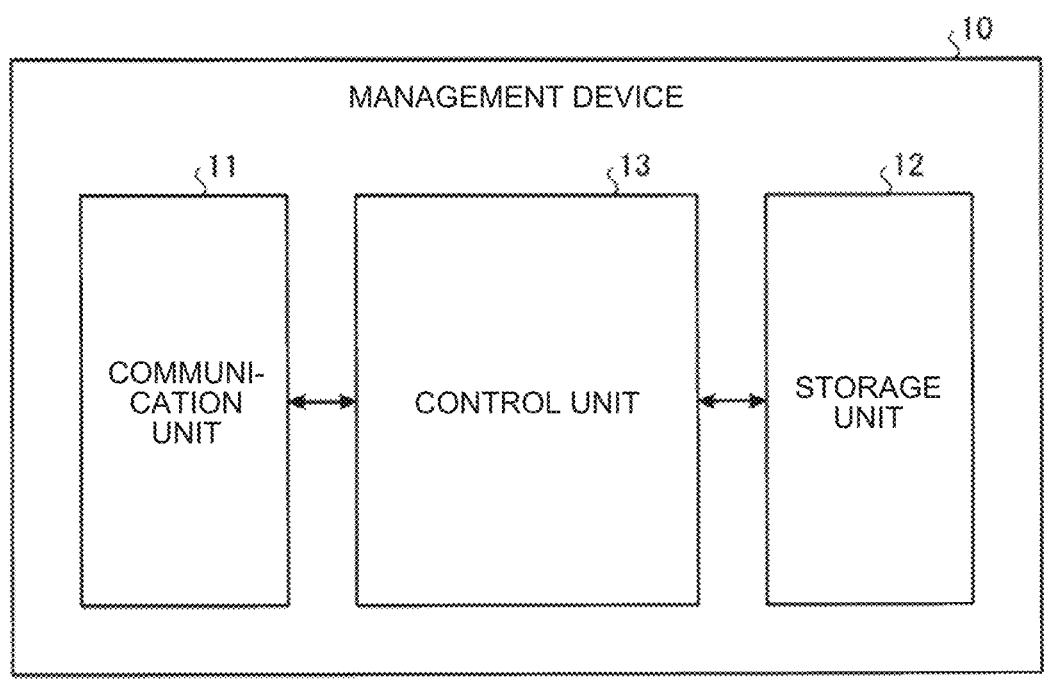
FIG. 5 is a diagram illustrating a configuration example of a management device according to the embodiment of the present disclosure.

FIG. 5 is a diagram illustrating a configuration example of the management device 10 according to the embodiment of the present disclosure. The management device 10 includes a communication unit 11, a storage unit 12, and a control unit 13. Note that the configuration illustrated in FIG. 5 is a functional configuration, and its hardware configuration may be different from the illustrated one. In addition, the functions of the management device 10 may be implemented in the form distributed in a plurality of physically separated components. For example, the management device 10 may be constituted by a plurality of server devices.

The communication unit 11 is a communication interface configured to communicate with other devices. The communication unit 11 may be a network interface or a device connection interface. For example, the communication unit 11 may be a local area network (LAN) interface such as a network interface card (NIC) or may be a universal serial bus (USB) interface including a USB host controller, a USB port, and the like. In addition, the communication unit 11 may be a wired interface or a wireless interface. The communication unit 11 functions as a communication means of the management device 10. The communication unit 11 communicates with the terrestrial station 30 or the relay station 60 under the control of the control unit 13.

The storage unit 12 is a data readable/writable storage device, such as a dynamic random access memory (DRAM), a static random access memory (SRAM), a flash memory, and a hard disk. The storage unit 12 functions as a storage means of the management device 10. The storage unit 12 stores, for example, a connected state of the communication device 50. For example, the storage unit 12 stores a state of radio resource control (RRC) and a state of EPS connection management (ECM) of the communication device 50. The storage unit 12 may function as a home memory that stores position information of the communication device 50.

The control unit 13 is a controller that controls the respective units of the management device 10. The control unit 13 is realized by a processor such as a central processing unit (CPU) and a micro-processing unit (MPU). For example, the control unit 13 is realized as the processor executes various programs stored in the storage device inside the management device 10 using a random access memory (RAM) or the like as a work area. Note that the control unit 13 may be realized by an integrated circuit such as an application-specific integrated circuit (ASIC) and a field-programmable gate arrays (FPGA). All the CPU, MPU, ASIC, and FPGA can be regarded as controllers.

<2-3. Configuration of Base Station>

Next, the configuration of the base station will be described. The communication system 1 includes, as a base station, the non-terrestrial stations 20 constituting a non-terrestrial network and the terrestrial stations 30 constituting a terrestrial network. All the non-terrestrial stations 20 constituting the non-terrestrial network are movable. First, the configuration of the non-terrestrial station 20 will be described.

[Non-Terrestrial Station]

Figure 6:
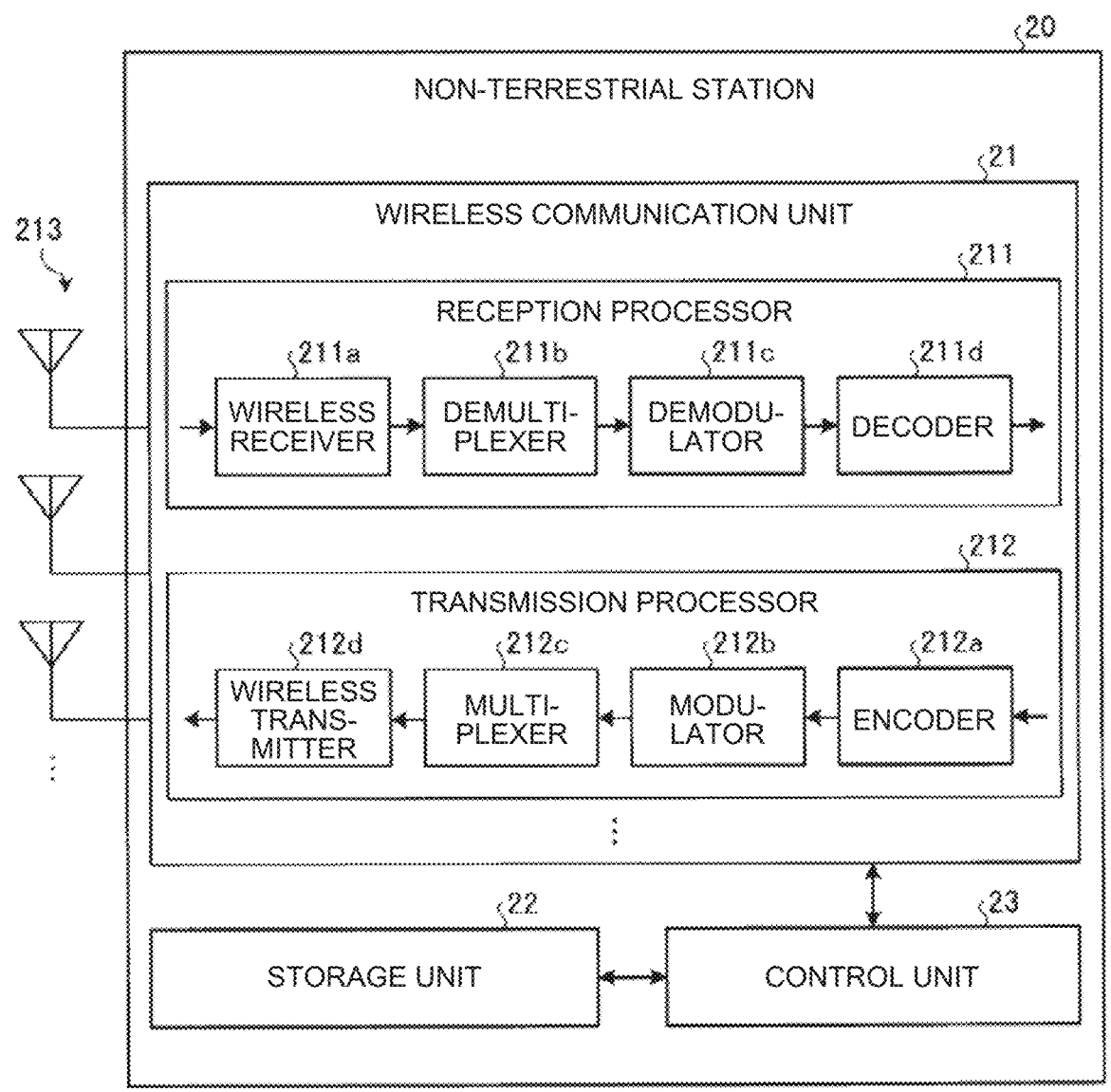
FIG. 6 is a diagram illustrating a configuration example of a non-terrestrial station according to the embodiment of the present disclosure.

FIG. 6 is a diagram illustrating a configuration example of the non-terrestrial station 20 according to the embodiment of the present disclosure. The non-terrestrial station 20 includes a wireless communication unit 21, a storage unit 22, and a control unit 23. Note that the configuration illustrated in FIG. 6 is a functional configuration, and its hardware configuration may be different from the illustrated one. In addition, the functions of the non-terrestrial station 20 may be implemented in the form distributed in a plurality of physically separated components.

The wireless communication unit 21 is a wireless communication interface that wirelessly communicates with other wireless communication devices (for example, the communication device 50 and the relay station 60). The wireless communication unit 21 supports one or a plurality of radio access schemes. For example, the wireless communication unit 21 supports both NR and LTE. The wireless communication unit 21 may support W-CDMA or cdma2000 in addition to NR and LTE. The wireless communication unit 21 includes a reception processor 211, a transmission processor 212, and an antenna 213. The wireless communication unit 21 may include a plurality of reception processors 211, transmission processors 212, and antennas 213. Note that the respective units of the wireless communication unit 21 can be configured to support individually for each radio access scheme when the wireless communication unit 21 supports a plurality of radio access schemes. For example, the reception processor 211 and the transmission processor 212 may be configured to support individually for LTE and NR.

The reception processor 211 processes an uplink signal received via the antenna 213. The reception processor 211 includes a wireless receiver 211a, a demultiplexer 211b, a demodulator 211c, and a decoder 211d.

The wireless receiver 211a down-converts an uplink signal, removes an unnecessary frequency component, controls an amplification level, performs orthogonal demodulation, performs conversion to a digital signal, removes a guard interval, extracts a frequency domain signal using fast Fourier transform, or the like. The demultiplexer 211b separates the signal output from the wireless receiver 211a into an uplink channel, such as a physical uplink shared channel (PUSCH) and a physical uplink control channel (PUCCH), and an uplink reference signal. The demodulator 211c demodulates a received signal using a modulation scheme such as binary phase shift keying (BPSK) and quadrature phase shift keying (QPSK) for a modulated symbol of the uplink channel. The modulation scheme used by the demodulator 211c may be 16-quadrature amplitude modulation (QAM), 64QAM, 256QAM, or the like. The decoder 211d performs decoding processing on demodulated coded bits of the uplink channel. The decoded uplink data and uplink control information are output to the control unit 23.

The transmission processor 212 performs transmission processing of downlink control information and downlink data. The transmission processor 212 includes an encoder 212a, a modulator 212b, a multiplexer 212c, and a wireless transmitter 212d.

The encoder 212a encodes the downlink control information and downlink data input from the control unit 23 using an encoding scheme such as block encoding, convolutional encoding, and turbo encoding. The modulator 212b modulates coded bits output from the encoder 212a by using a predetermined modulation scheme such as BPSK, QPSK, 16QAM, 64QAM, and 256QAM. The multiplexer 212c multiplexes a modulated symbol and a downlink reference signal on each channel and arranges the multiplexed modulated symbol and downlink reference signal in a predetermined resource element. The wireless transmitter 212d performs various types of signal processing on the signal from the multiplexer 212c. For example, the wireless transmitter 212d performs processing such as conversion into the time domain by fast Fourier transform, addition of a guard interval, generation of a baseband digital signal, conversion into an analog signal, quadrature modulation, up-conversion, removal of extra frequency components, and power amplification. The signal generated by the transmission processor 212 is transmitted through the antenna 213.

The storage unit 22 is a data readable/writable storage device such as a DRAM, an SRAM, a flash memory, and a hard disk. The storage unit 22 functions as a storage means of the non-terrestrial station 20. The storage unit 22 stores switching information. The switching information is information used by the communication device 50 to switch the base station. Examples of the switching information include information such as resource information, trigger information, timing advance information, and the like.

The resource information is information relating to a radio resource used by the connected communication device 50 to perform wireless communication with the base station which is a switching destination candidate configured to be movable. In addition, the trigger information is information used by the communication device 50 to determine whether or not to switch the base station which is a connection destination. In addition, the timing advance information is information relating to timing advance for connection of the communication device 50 with the base station which is a switching destination candidate. The resource information, trigger information, and timing advance information will be described in detail later.

The control unit 23 is a controller that controls the respective units of the non-terrestrial station 20. The control unit 23 is realized by a processor such as a central processing unit (CPU) and a micro-processing unit (MPU). For example, the control unit 23 is realized as the processor executes various programs stored in the storage device inside the non-terrestrial station 20 using a random access memory (RAM) or the like as a work area. Note that the control unit 23 may be realized by an integrated circuit such as an application-specific integrated circuit (ASIC) and a field-programmable gate array (FPGA). All the CPU, MPU, ASIC, and FPGA can be regarded as controllers.

[Terrestrial Station]

Figure 7:
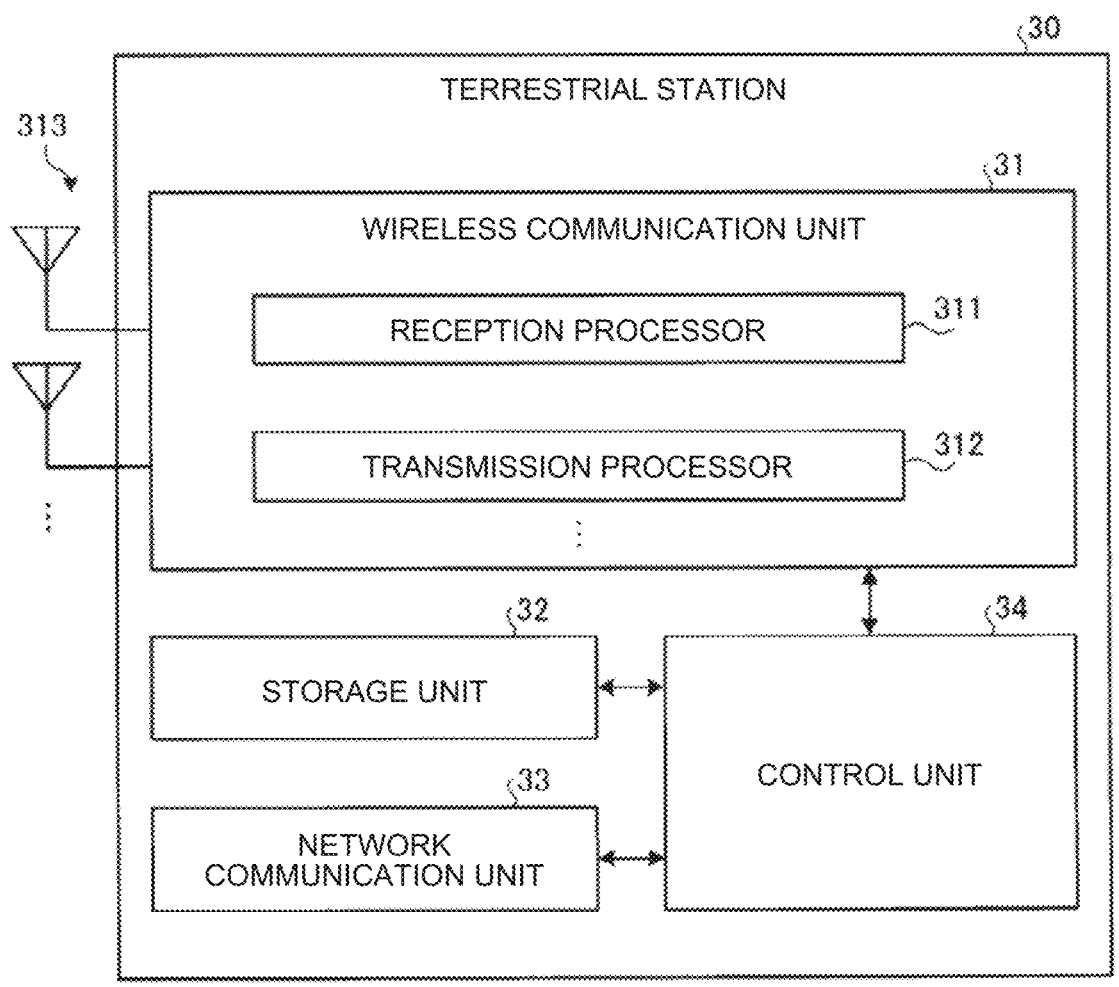
FIG. 7 is a diagram illustrating a configuration example of a terrestrial station according to the embodiment of the present disclosure.

Next, the configuration of the terrestrial station 30 will be described. FIG. 7 is a diagram illustrating a configuration example of the terrestrial station 30 according to the embodiment of the present disclosure. The terrestrial station 30 includes a wireless communication unit 31, a storage unit 32, a network communication unit 33, and a control unit 34. Note that the configuration illustrated in FIG. 7 is a functional configuration, and its hardware configuration may be different from the illustrated one. In addition, the functions of the terrestrial station 30 may be implemented in the form distributed in a plurality of physically separated components.

The wireless communication unit 31 is a wireless communication interface that performs wireless communication with other wireless communication devices (for example, the communication device 50). The wireless communication unit 31 includes a reception processor 311, a transmission processor 312, and an antenna 313. The configurations of the wireless communication unit 31, the reception processor 311, the transmission processor 312, and the antenna 313 are respectively similar to those of the wireless communication unit 21, the reception processor 211, the transmission processor 212, and the antenna 213 of the non-terrestrial station 20.

The storage unit 32 is a data readable/writable storage device such as a DRAM, an SRAM, a flash memory, and a hard disk. The storage unit 32 functions as a storage means of the terrestrial station 30. The configuration of the storage unit 32 is similar to that of the storage unit 22 of the non-terrestrial station 20.

The network communication unit 33 is a communication interface for communicating with other devices. For example, the network communication unit 33 is a LAN interface such as NIC. The network communication unit 33 can be a wired interface or a wireless interface. The network communication unit 33 functions as a network communication means of the terrestrial station 30. The network communication unit 33 communicates with the management device 10 and the relay station 60 under the control of the control unit 34.

The control unit 34 is a controller that controls the respective units of the terrestrial station 30. The configuration of the control unit 34 is similar to that of the control unit 23 of the non-terrestrial station 20.

<2-4. Configuration of Relay Station>

Figure 8:
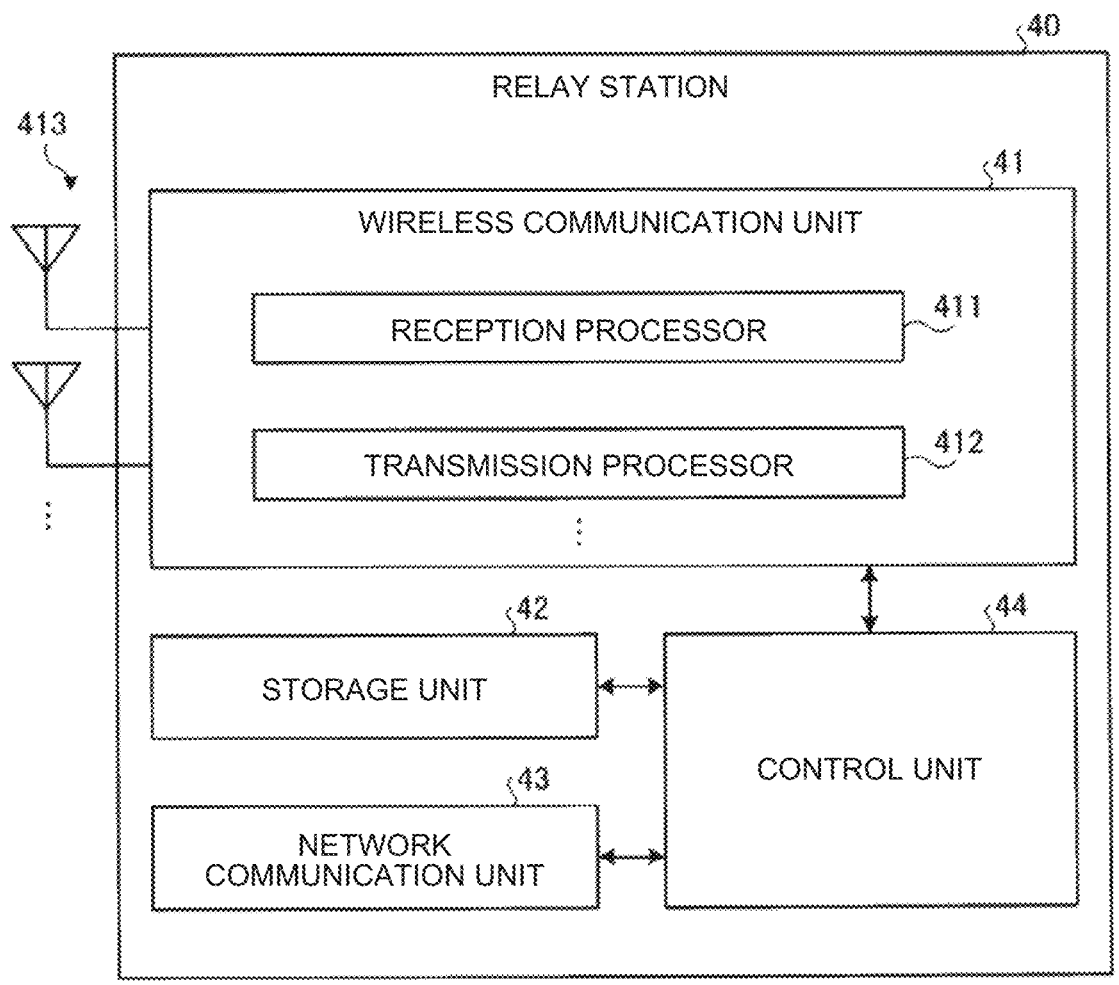
FIG. 8 is a diagram illustrating a configuration example of a relay station according to the embodiment of the present disclosure.

Next, the configuration of the relay station 40 will be described. FIG. 8 is a diagram illustrating a configuration example of the relay station 40 according to the embodiment of the present disclosure. The relay station 40 includes a wireless communication unit 41, a storage unit 42, a network communication unit 43, and a control unit 44. Note that the configuration illustrated in FIG. 8 is a functional configuration, and its hardware configuration may be different from the illustrated one. In addition, the functions of the relay station 40 may be implemented in the form distributed in a plurality of physically separated components.

The wireless communication unit 41 is a wireless communication interface that wirelessly communicates with other wireless communication devices (for example, the non-terrestrial station 20, the terrestrial station 30, and the communication device 50). The wireless communication unit 41 includes a reception processor 411, a transmission processor 412, and an antenna 413. The configurations of the wireless communication unit 41, the reception processor 411, the transmission processor 412, and the antenna 413 are respectively similar to those of the wireless communication unit 21, the reception processor 211, the transmission processor 212, and the antenna 213 of the non-terrestrial station 20.

The storage unit 42 is a data readable/writable storage device such as a DRAM, an SRAM, a flash memory, and a hard disk. The storage unit 42 functions as a storage means of the relay station 40. The configuration of the storage unit 42 is similar to that of the storage unit 22 of the non-terrestrial station 20.

The network communication unit 43 is a communication interface for communicating with other devices. For example, the network communication unit 43 is a LAN interface such as NIC. The network communication unit 43 may be a wired interface or a wireless interface. The network communication unit 43 functions as a network communication means of the relay station 40. The network communication unit 43 communicates with the non-terrestrial station 20 and the terrestrial station 30 under the control of the control unit 44.

The control unit 44 is a controller that controls the respective units of the relay station 40. The configuration of the control unit 44 is similar to that of the control unit 23 of the non-terrestrial station 20.

<2-5. Configuration of Communication Device>

Figure 9:
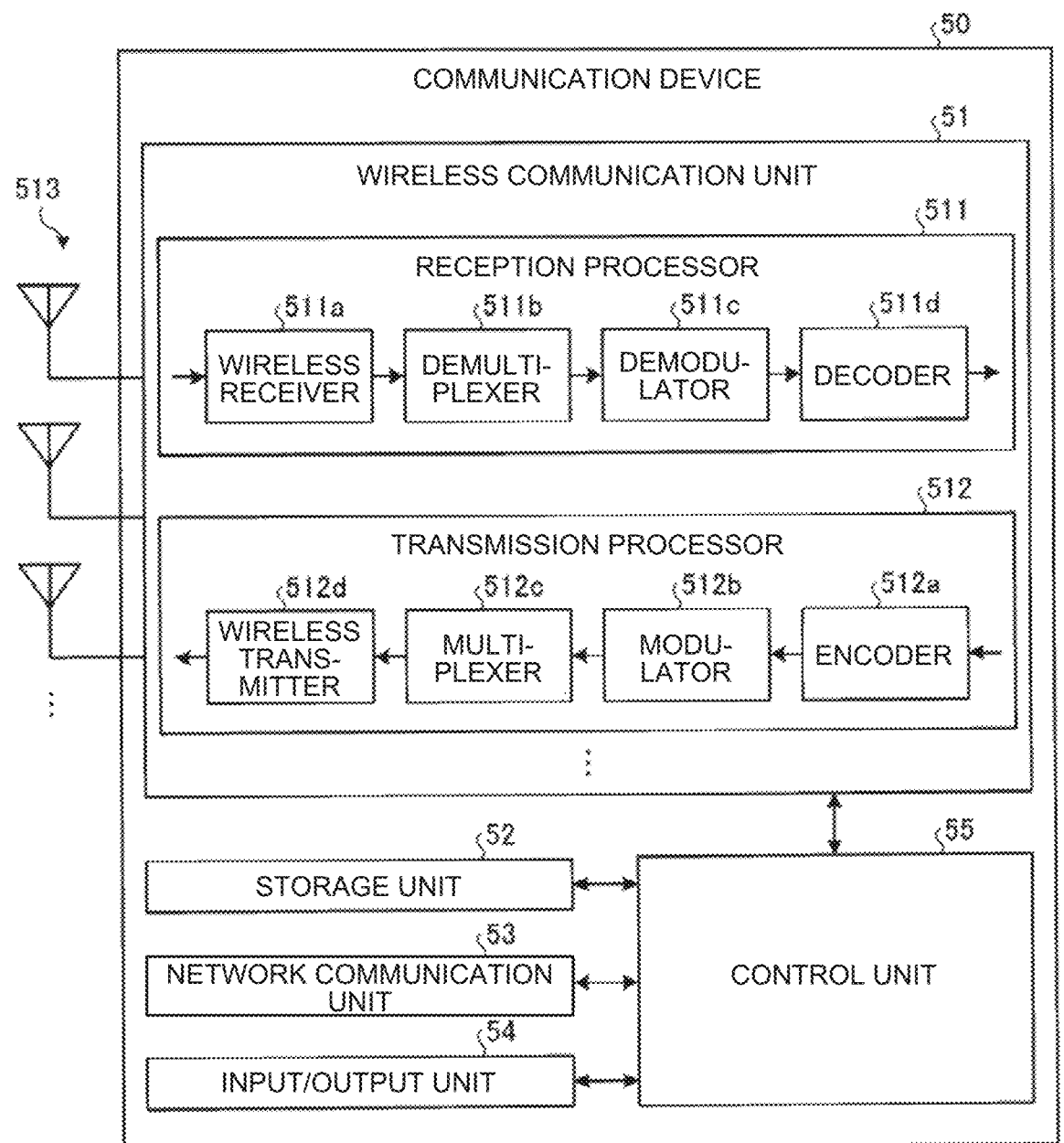
FIG. 9 is a diagram illustrating a configuration example of a communication device according to the embodiment of the present disclosure.

Next, the configuration of the communication device 50 will be described. FIG. 9 is a diagram illustrating a configuration example of the communication device 50 according to the embodiment of the present disclosure. The communication device 50 includes a wireless communication unit 51, a storage unit 52, a network communication unit 53, an input/output unit 54, and a control unit 55. Note that the configuration illustrated in FIG. 9 is a functional configuration, and its hardware configuration may be different from the illustrated one. In addition, the functions of the communication device 50 may be implemented in the form distributed in a plurality of physically separated components.

The wireless communication unit 51 is a wireless communication interface that wirelessly communicates with other wireless communication devices (for example, the non-terrestrial station 20, the terrestrial station 30, and the relay station 40). The wireless communication unit 51 supports one or a plurality of radio access schemes. For example, the wireless communication unit 51 supports both NR and LTE. The wireless communication unit 51 may support W-CDMA or cdma2000 in addition to NR and LTE. The wireless communication unit 51 includes a reception processor 511, a transmission processor 512, and an antenna 513. The wireless communication unit 51 may include a plurality of reception processors 511, transmission processors 512, and antennas 513. Note that the respective units of the wireless communication unit 51 can be configured to support individually for each radio access scheme when the wireless communication unit 51 supports a plurality of radio access schemes. For example, the reception processor 511 and the transmission processor 512 may be configured to support individually for LTE and NR.

The reception processor 511 processes a downlink signal received via the antenna 513. The reception processor 511 includes a wireless receiver 511*a*, a demultiplexer 511*b*, a demodulator 511*c*, and a decoder 511*d*.

The wireless receiver 511*a* down-converts a downlink signal, removes an unnecessary frequency component, controls an amplification level, performs orthogonal demodulation, performs conversion to a digital signal, removes a guard interval, extracts a frequency domain signal using fast Fourier transform, or the like. The demultiplexer 511*b* separates a signal output from the wireless receiver 511*a* into a downlink channel, a downlink synchronization signal, and a downlink reference signal. The downlink channel is a channel such as a physical broadcast channel (PBCH), a physical downlink shared channel (PDSCH), and a physical downlink control channel (PDCCH). The demodulator 211*c* demodulates a received signal using a modulation scheme such as BPSK, QPSK, 16QAM, 64QAM, and 256QAM, for a modulated symbol on a downlink channel. The decoder 511*d* performs decoding processing on a demodulated coded bits on a downlink channel. The decoded downlink data and downlink control information are output to the control unit 23.

The transmission processor 512 performs transmission processing of uplink control information and uplink data. The transmission processor 512 includes an encoder 512a, a modulator 512b, a multiplexer 512c, and a wireless transmitter 512d.

The encoder 512a encodes the uplink control information and uplink data input from the control unit 55 using an encoding scheme such as block encoding, convolutional encoding, and turbo encoding. The modulator 512b modulates the coded bits output from the encoder 512a by using a predetermined modulation scheme such as BPSK, QPSK, 16QAM, 64QAM, and 256QAM. The multiplexer 512c multiplexes a modulated symbol and uplink reference signal on each channel and arranges the multiplexed modulated symbol and downlink reference signal in a predetermined resource element. The wireless transmitter 512d performs various types of signal processing on the signal from the multiplexer 512c. For example, the wireless transmitter 512d performs processing such as conversion into the time domain by inverse fast Fourier transform, addition of a guard interval, generation of a baseband digital signal, conversion into an analog signal, quadrature modulation, up-conversion, removal of extra frequency components, and power amplification. A signal generated by the transmission processor 512 is transmitted through the antenna 513.

The storage unit 52 is a data readable/writable storage device such as a DRAM, an SRAM, a flash memory, and a hard disk. The storage unit 52 functions as a storage means of the communication device 50. The storage unit 52 stores switching information. The switching information is information acquired from the non-terrestrial station 20, the terrestrial station 30, or the relay station 40, and is used by the communication device 50 to switch the base station. Examples of the switching information include information such as resource information, trigger information, timing advance information, and the like. The resource information, trigger information, and timing advance information will be described in detail later.

The network communication unit 53 is a communication interface for communicating with other devices. For example, the network communication unit 53 is a LAN interface such as NIC. The network communication unit 53 may be a wired interface or a wireless interface. The network communication unit 53 functions as a network communication means of the communication device 50. The network communication unit 53 communicates with other devices under the control of the control unit 55.

The input/output unit 54 is a user interface for exchanging information with a user. For example, the input/output unit 54 is an operation device such as a keyboard, a mouse, operation keys, and a touch panel for the user to perform various operations. Alternatively, the input/output unit 54 is a display device such as a liquid crystal display (LCD) and an organic electroluminescence (EL) display. The input/output unit 54 may be an audio device such as a speaker and a buzzer. In addition, the input/output unit 54 may be a lighting device such as a light-emitting diode (LED) lamp. The input/output unit 54 functions as an input/output means (input means, output means, operation means, or notification means) of the communication device 50.

The control unit 55 is a controller that controls the respective units of the communication device 50. The control unit 55 is realized by a processor such as a CPU and an MPU. For example, the control unit 55 is realized as the processor executes various programs stored in the storage device inside the communication device 50 using a RAM or the like as a work area. Note that the control unit 55 may be realized by an integrated circuit such as an ASIC and an FPGA. All the CPU, MPU, ASIC, and FPGA can be regarded as controllers.

<2-6. Initial Connection Process>

Next, the operation of the communication system 1 will be described. First, an initial connection process will be described. Initial connection is a process for transition of the communication device 50 from a state of being connected to no cell (idle state) to a state of having established connection with a cell (connection state).

Figure 10:
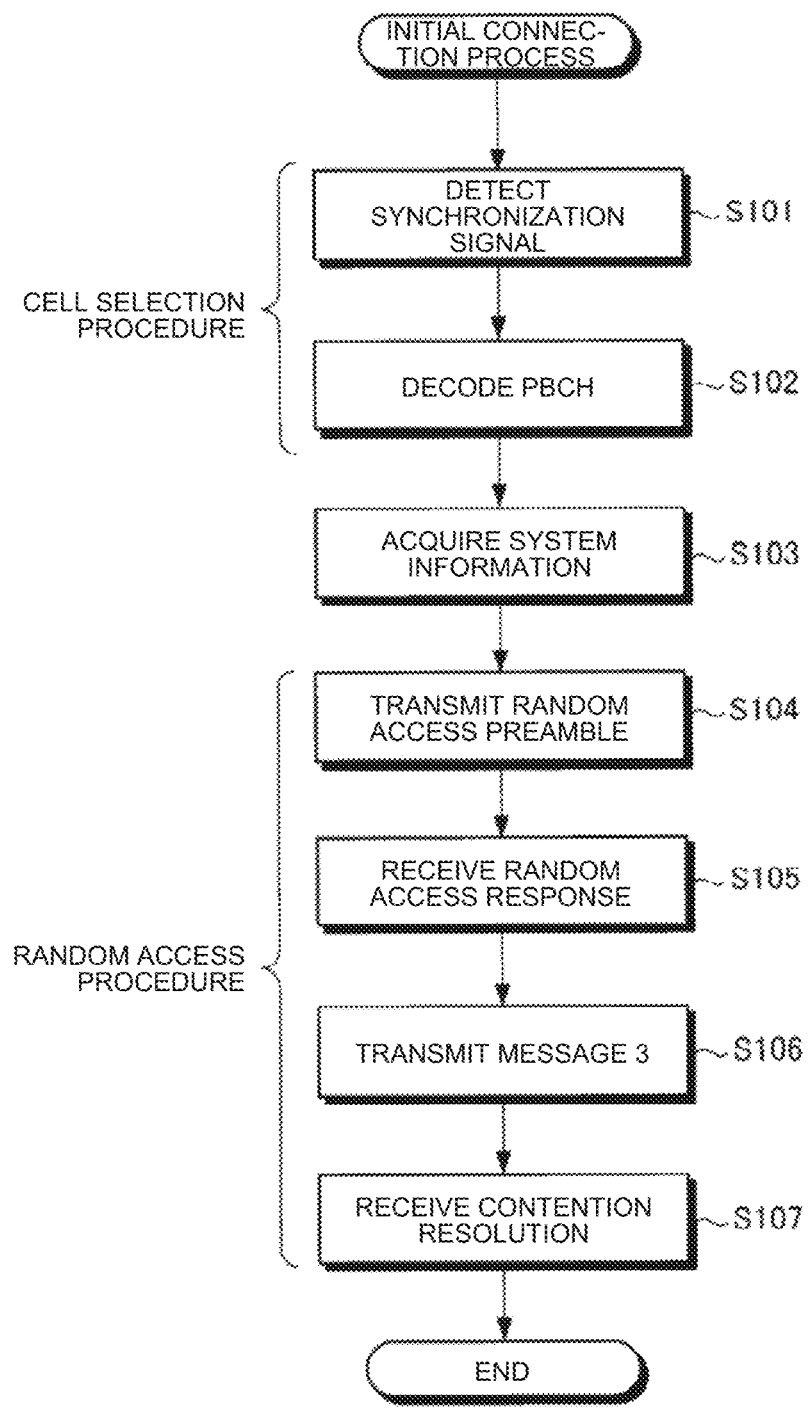
FIG. 10 is a flowchart illustrating an example of an initial connection process according to the present disclosure.

FIG. 10 is a flowchart illustrating an example of the initial connection process according to the present disclosure. Hereinafter, the initial connection process will be described below with reference to FIG. 10. The initial connection process described hereinafter is executed by the control unit 55 of the communication device 50 when the communication device 50 is powered on, for example.

As illustrated in FIG. 10, first, the communication device 50 in the idle state first performs a cell selection procedure. The cell selection procedure includes steps of detecting a synchronization signal and decoding a physical broadcast channel (PBCH). The communication device 50 detects a synchronization signal (Step S101), and synchronizes a cell and a downlink based on the detected synchronization signal.

Next, the communication device 50 attempts to decode a PBCH after establishing the downlink synchronization (Step S102), and acquires system information (Step S103). At this time, the communication device 50 first acquires first system information, and then, acquires second system information based on the first system information included in the PBCH.

Then, the communication device 50 performs a random access procedure (random access channel (RACH) procedure) on the basis of the first system information and/or the second system information. The random access procedure includes steps of transmitting a random access preamble, receiving a random access response, transmitting a message 3, and receiving contention resolution.

In the random access procedure, the communication device 50 first selects a predetermined physical random access channel (PRACH) preamble and performs transmission (Step S104). Next, the communication device 50 receives a physical downlink shared channel (PDSCH) including a random access response corresponding to the PRACH preamble (Step S105).

Next, the communication device 50 transmits the PUSCH including the message 3 by using a resource scheduled by a random access response grant included in the received random access response (Step S106). Finally, the communication device 50 receives the PDSCH including the contention resolution corresponding to the PUSCH (Step S107).

The message 3 includes a radio resource control (RRC) message for an RRC connection request. The contention resolution includes an RRC message on RRC connection setup. When receiving the RRC message on RRC connection setup, the communication device 50 performs an RRC connection operation and transitions from an RRC idle state to an RRC connection state. After transition to the RRC connection state, the communication device 50 transmits an RRC message on RRC connection setup completion to the base station device. Through these series of operations, the communication device 50 can be connected to the base station device.

Note that the random access preamble is also referred to as message 1, the random access response is referred to as message 2, the contention resolution is referred to as message 4, and the RRC connection setup completion message is referred to as message 5. After all the steps of the random access procedure are completed, the communication device 50 can transition to the state of being connected to the relevant cell (connection state).

Note that the random access procedure illustrated in FIG. 10 is also referred to as a 4-step RACH procedure. On the other hand, a random access procedure in which the communication device 50 performs transmission of a message 3 along with transmission of a random access preamble and, in response thereto, the base station device transmits a random access response and contention resolution is referred to as a 2-step RACH procedure. The 2-step RACH procedure will be described later with reference to FIG. 13.

A random access preamble is transmitted in association with PRACH. A random access response is transmitted on the PDSCH. The PDSCH including the random access response is scheduled by a physical downlink control channel (PDCCH). The message 3 is transmitted on the PUSCH. PUSCH including message 3 is scheduled by an uplink grant included in a random access response.

[System Information]

Next, the system information according to the present disclosure will be described. The system information is information used to notify the configuration in a cell that transmits the system information. Examples of the system information include information on access to the cell, information on cell selection, information on another radio access technology (RAT) and another system, and the like.

The system information can be classified into a master information block (MIB) and a system information block (SIB). The MIB is information of a fixed payload size broadcast by the PBCH. The MIB contains information for acquiring the SIB. The SIB is system information other than the MIB. The SIB is reported by the PDSCH.

In addition, the system information can be classified into the first system information, the second system information, and third system information. The first system information and the second system information include information on access to the cell, information on acquisition of other system information, and information on cell selection. The information included in the MIB can be regarded as the first system information, and the information included in SIB1 can be regarded as the second system information. The communication device 50 assumes that access to the cell is prohibited if it is difficult to acquire the first system information from the cell.

The MIB is physical layer information required to receive the system information, and includes part of a system frame number, information on at least SIB1, Msg.2/4 for initial connection, paging, and subcarrier spacing of broadcast SI messages, subcarrier offset information, location information of DMRS type A, a PDCCH configuration for at least SIB1, cell-barred information, intra-frequency reselection information, and the like.

The SIB1 includes information on cell selection, information on cell access, information on connection establishment failure control, scheduling information of system information other than SIB1, a serving cell configuration, and the like. The serving cell configuration includes cell-specific parameters, such as a downlink configuration, an uplink configuration, and a TDD configuration information. The uplink configuration includes an RACH configuration and the like.

[RACH Procedure]

Next, the RACH procedure according to the present disclosure will be described. The RACH procedure is performed to achieve purposes such as RRC connection setup from an idle state to an inactive state or a connected state, a request for a state transition from the inactive state to the connected state, and handover for switching a connected cell.

In addition, the RACH procedure is also performed to achieve purposes such as a scheduling request for requesting a resource for uplink data transmission and timing advance adjustment for adjusting uplink synchronization. In addition, the RACH procedure is also performed in order to achieve purposes such as an on-demand SI request for requesting system information that has not been transmitted, and restoration of broken beam connection (beam recovery).

The RRC connection setup from the idle state to the inactive state or the connected state is an operation performed when the communication device 50 is connected to the base station device in response to the occurrence of traffic or the like. Specifically, it is an operation of delivering information regarding the connection (for example, UE context) from the base station device to the communication device 50.

The UE context is managed by predetermined communication device identification information (for example, C-RNTI) indicated by the base station device. When completing this operation, the communication device 50 makes a state transition from the idle state to the inactive state or the connected state.

The request for the state transition from the inactive state to the connected state is an operation of requesting a state transition from the inactive state to the connected state in response to the occurrence of traffic. The transition to the connected state makes it possible for the communication device 50 to transmit or receive unicast data to or from the base station device.

The handover for switching the connected cell is an operation of switching the connection from the connected (serving) cell to a cell (neighbor cell) adjacent to the cell due to changes in the radio environment such as the movement of the communication device 50. The communication device 50, which has received a handover command from the base station device, makes a connection request to the neighbor cell specified by the handover command.

The scheduling request is an operation of making a resource request for uplink data transmission in response to the occurrence of traffic or the like. After normally receiving this scheduling request, the base station device assigns a PUSCH resource to the communication device 50. Note that the scheduling request is also made over the PUCCH.

The timing advance adjustment is an operation of adjusting an error between downlink and uplink frames caused by a propagation delay. The communication device 50 transmits the PRACH at the timing adjusted to the downlink frame. As a result, it is possible for the base station device to recognize the propagation delay with the communication device 50 and to indicate a value of the timing advance to the communication device 50 using the message 2 or the like.

The on-demand SI request requesting the system information that has not been transmitted is an operation of requesting the base station device to transmit the system information when the system information that has not transmitted because of the overhead of the system information or the like is necessary for the communication device 50.

The restoration (beam recovery) of the disconnected beam connection is an operation of requesting a recovery when the communication quality deteriorates due to the movement of the communication device 50 or blocking of a communication path by another object after establishment of a beam. The base station device that has received this request attempts to connect with the communication device 50 using another beam.

In addition, the RACH procedure further includes a contention-based RACH procedure and a non-contention RACH procedure. Next, the contention-based RACH procedure and the non-contention RACH procedure will be described.

[Contention-Based RACH Procedure]

Figure 11:
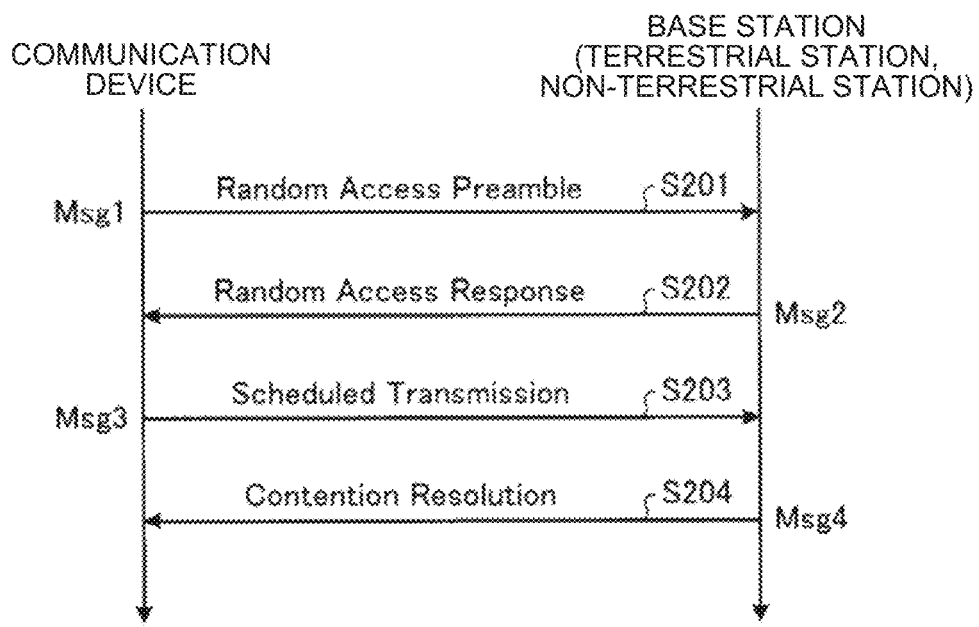
FIG. 11 is a sequence diagram illustrating a contention-based RACH procedure according to the present disclosure.

FIG. 11 is a sequence diagram illustrating the contention-based RACH procedure according to the present disclosure. The contention-based RACH procedure is a RACH procedure performed by the communication device 50. The contention-based RACH procedure is a 4-step procedure that begins with the transmission of a message 1 from communication device 50.

The communication device 50 selects PRACH from among a plurality of preset RACH resources and a plurality of PRACH preambles, and transmits the PRACH. Since the plurality of RACH resources and the plurality of PRACH preambles are shared with other communication devices 50, PRACHs are sometimes contentious.

The contention-based RACH procedure includes steps of transmitting a random access preamble (Msg1), receiving a random access response (Msg2), transmitting a message (Msg3), and receiving a contention resolution message (Msg4).

As illustrated in FIG. 11, in the contention-based RACH procedure, first, the control unit 55 in the communication device 50 randomly selects a preamble sequence to use from among a plurality of preamble sequences determined in advance. Then, the control unit 55 transmits a message including the selected preamble sequence (Msg1: random access preamble) to the base station as a connection destination (Step S201). At this time, the base station may be the non-terrestrial station 20 or the terrestrial station 30. The description is hereinafter given on the assumption that the base station to which the control unit 55 transmits the random access preamble is the non-terrestrial station 20. The random access preamble is transmitted over PRACH.

When receiving the random access preamble, the control unit 23 of the non-terrestrial station 20 causes a random access response (Msg2: random access response), which is a response to the random access preamble, to be transmitted to the communication device 50. This random access response is transmitted using PDSCH, for example. The control unit 55 in the communication device 50 receives the random access response (Msg2) transmitted from the base station (Step S202). The random access response includes one or a plurality of random access preambles, which are receivable by the base station, and uplink (UL) resources (hereinafter referred to as uplink grants) corresponding to the random access preamble. In addition, the random access response includes a temporary cell-radio network temporary identifier (TC-RNTI), which is assigned temporarily to the communication device 50 by the base station and is a unique identifier of the communication device 50.

When receiving the random access response from the base station, the control unit 55 of the communication device 50 discriminates whether or not the received information includes the random access preamble transmitted in Step S201. If the random access preamble is included, the control unit 55 extracts the uplink grant corresponding to the random access preamble transmitted in Step S201 from among the uplink grants included in the random access response. The control unit 55 then transmits an UL message (Msg3: scheduled transmission) using the resource scheduled by the extracted uplink grant (step S203). The transmission of the message (Msg3) is performed using PUSCH. The message (Msg3) includes an RRC message for a radio resource control (RRC) connection request. In addition, the message (Msg3) includes the identifier of the communication device 50.

In the contention-based RACH procedure, the random access preamble randomly selected by the communication device 50 is used in the procedure. Therefore, there may occur a case where the communication device 50 transmits the random access preamble and, at the same time, another communication device 50 transmits the same random access preamble to the non-terrestrial station 20. Thus, the control unit 23 of the non-terrestrial station 20 receives the identifier transmitted by the communication device 50 in Step S203 to recognize which communication devices 50 have preamble contention and to resolve the contention. The control unit 23 causes contention resolution (Msg4: contention resolution) to be transmitted to the communication device 50 selected as the result of the contention resolution. The contention resolution (Msg4) includes the identifier transmitted by the control unit 55 in Step S203. In addition, the contention resolution (Msg4) includes an RRC message for the RRC connection setup. The control unit 55 receives the contention resolution message (Msg4) transmitted from the base station (Step S204).

[Non-Contention-Based RACH Procedure]

Figure 12:
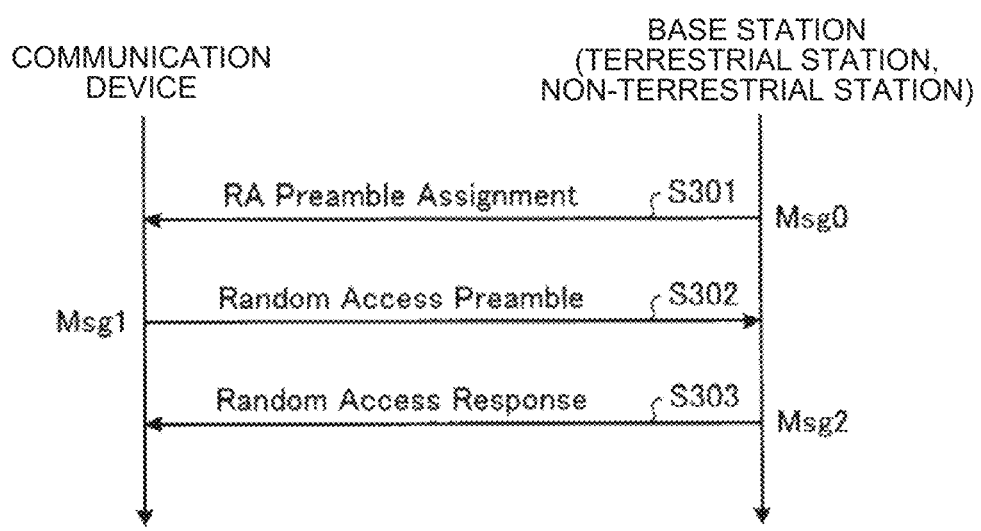
FIG. 12 is a sequence diagram illustrating a non-contention-based RACH procedure according to the present disclosure.

FIG. 12 is a sequence diagram illustrating the non-contention-based RACH procedure according to the present disclosure. The non-contention RACH procedure is a RACH procedure performed by the base station. The non-contention RACH procedure is a 3-step procedure that begins with the transmission of a PDCCH order from the base station device. The communication device 50 transmits PRACH using a PRACH preamble designated by the PDCCH order. Since the base station device schedules the PRACH preamble, PRACH contention hardly occurs.

The non-contention RACH procedure includes steps of receiving a random access preamble assignment (Msg0), transmitting a random access preamble (Msg1), and receiving a random access response (Msg2). Note that the following description regarding the random access procedure is given on the assumption that the base station is the non-terrestrial station 20, but the base station may be the terrestrial station 30.

In the contention RACH procedure, the control unit 55 of the communication device 50 randomly selects a preamble sequence. In the non-contention RACH procedure, however, the non-terrestrial station 20 assigns an individual random access preamble to the communication device 50. The control unit 55 of the communication device 50 receives the random access preamble assignment (Msg0: RA preamble assignment) from the non-terrestrial station 20 (Step S301).

The control unit 55 of the communication device 50 executes random access to the non-terrestrial station 20 using the random access preamble assigned in Step S301. In other words, the control unit 55 of the communication device 50 transmits the assigned random access preamble (Msg1: random access preamble) to the non-terrestrial station 20 over PRACH (Step S302).

The control unit 23 of the non-terrestrial station 20 receives the random access preamble (Msg1) from the communication device 50. Then, the control unit 23 transmits a random access response to the random access preamble (Msg2: random access response) to the communication device 50 (Step S303). The random access response includes, for example, uplink grant information corresponding to the received random access preamble. When receiving the random access response (Msg2), the control unit 55 of the communication device 50 performs the RRC connection operation to transit from the idle state (RRC_IDLE) to the connected state (RRC_CONNECTED).

[Details of PRACH of NR]

NR-PRACH is configured using a Zadoff-Chu sequence. In NR-PRACH, a plurality of preamble formats are defined. Moreover, the preamble format is defined by a combination of parameters such as PRACH subcarrier spacing, a transmission bandwidth, a sequence length, the number of symbols used for transmission, the number of transmission repetitions, a CP length, and a guard period length.

For the communication device 50 in the idle mode, the configuration regarding NR-PRACH is made by the system information. Furthermore, for a terminal device in the connection mode, the configuration regarding NR-PRACH is made using the dedicated RRC signaling.

NR-PRACH is transmitted by a physical resource (NR-PRACH occasion) capable of transmitting NR-PRACH. The physical resource is indicated by the configuration for NR-PRACH. The communication device 50 selects any of physical resources and transmits NR-PRACH.

In addition, the communication device 50 in the connection mode transmits NR-PRACH using an NR-PRACH resource. The NR-PRACH resource is a combination of the NR-PRACH preamble and its physical resource. The base station device can indicate the NR-PRACH resource to the terminal device.

The types of NR-PRACH preamble sequences are numbered. The type number of the preamble sequences is called a preamble index. NR-PRACH is retransmitted even when the random access procedure fails.

During the retransmission, the communication device 50 waits for the transmission of NR-PRACH for a waiting period calculated from a backoff value (backoff indicator, BI). Note that the backoff value may vary depending on the terminal category of the terminal device and the priority of occurred traffic.

At that time, a plurality of backoff values are notified, and the communication device 50 selects the backoff value to be used according to the priority. In addition, when NR-PRACH is retransmitted, the transmission power of the NR-PRACH is increased as compared with the initial transmission (this procedure is called power ramping).

[Details of NR Random Access Response]

An NR random access response is sent using NR-PDSCH. The NR-PDSCH including the random access response is scheduled by NR-PDCCH of which CRC is scrambled by RA-RNTI. The NR-PDCCH is transmitted on the common control subband. The NR-PDCCH is arranged in CSS (common search space).

Note that a value of the RA-RNTI is determined based on a transmission resource (time resource (slot or subframe) of NR-PRACH corresponding to the random access response and a frequency resource (resource block). Note that the NR-PDCCH can be arranged in the search space associated with the NR-PRACH linked to the random access response.

Specifically, the search space in which the NR-PDCCH is arranged is set in association with a preamble of the NR-PRACH and/or a physical resource in which the NR-PRACH is transmitted. The search space in which the NR-PDCCH is arranged is set in association with a preamble index and/or an index of the physical resource. The NR-PDCCH is NR-SS and QCL.

The random access response of NR is MAC information. The random access response of NR includes at least the uplink grant for transmitting the message 3 of NR, the value of the timing advance used for adjusting the uplink frame synchronization, and the value of temporary C-RNTI.

In addition, the random access response of NR includes the PRACH index used for NR-PRACH transmission corresponding to the random access response. In addition, the random access response of NR includes information regarding backoff used for waiting for PRACH transmission. The base station device performs transmission using the NR-PDSCH including these pieces of information.

The communication device 50 determines whether or not the random access preamble has been successfully transmitted based on these pieces of information. When determining that the transmission of the random access preamble has failed based on these pieces of information, the communication device 50 performs the process of transmitting the message 3 of NR in accordance with the information included in the random access response. On the other hand, when determining that the transmission of the random access preamble has failed, the communication device 50 considers that the random access procedure has failed, and performs an NR-PRACH retransmission process.

Note that the random access response of NR may include a plurality of uplink grants for transmitting the message 3 of NR. The communication device 50 can select one resource for transmitting the message 3 from among the plurality of uplink grants. As a result, the contention of transmission of the message 3 of NR can be mitigated when the different communication devices 50 receive random access responses of the same NR, so that a more stable random access procedure can be provided.

[Details of Message 3 of NR]

The message 3 of NR is sent using NR-PUSCH. The NR-PUSCH is transmitted using a resource instructed by a random access response. The message 3 of NR includes a message on an RRC connection request.

A waveform of NR-PUSCH transmitted including the message 3 of NR is instructed by a parameter included in system information. Specifically, OFDM or DFT-s-OFDM is determined according to the instruction of the parameter.

When receiving the message 3 of NR normally, the base station device shifts to a contention resolution transmission process. On the other hand, when failing to receive the message 3 of NR normally, the base station device can attempt to receive the message 3 of NR again for at least a predetermined period.

Another example of the instruction to retransmit the message 3 and the transmission resource includes an instruction by NR-PDCCH used for the instruction to retransmit the message 3. The NR-PDCCH is an uplink grant. DCI of the NR-PDCCH instructs the resource for retransmitting the message 3. The communication device 50 retransmits the message 3 based on the instruction of the uplink grant.

In addition, when the NR contention resolution is not successfully received within the predetermined period, the communication device 50 considers that the random access procedure has failed, and performs the NR-PRACH retransmission process. Note that a transmission beam of the communication device 50 that is used for retransmitting the message 3 of NR can be different from a transmission beam of the communication device 50 that is used for the initial transmission of the message 3.

In addition, if neither the NR contention resolution nor the retransmission instruction of the message 3 is received within the predetermined period, the communication device 50 considers that the random access procedure has failed, and performs the NR-PRACH retransmission process. The predetermined period is set using the system information, for example.

[Details of NR Contention Resolution]

The NR contention resolution is sent using NR-PDSCH. The NR-PDSCH including the contention resolution is scheduled by NR-PDCCH of which CRC is scrambled by temporary C-RNTI or C-RNTI. The NR-PDCCH is arranged in USS (terminal-specific search space). Note that the NR-PDCCH may be arranged in CSS.

When receiving the NR-PDSCH including the contention resolution normally, the communication device 50 returns an ACK to the base station device. Thereafter, the communication device 50 is set to the connected state considering that this random access procedure has succeeded. On the other hand, when the base station device receives NACK for the NR-PDSCH including the contention resolution from the communication device 50, or when there is no response, the NR-PDSCH containing the contention resolution is retransmitted. Furthermore, when the NR contention resolution is not successfully received within the predetermined period, the communication device 50 considers that the random access procedure has failed, and performs the NR-PRACH retransmission process.

[2-Step RACH of NR]

Figure 13:
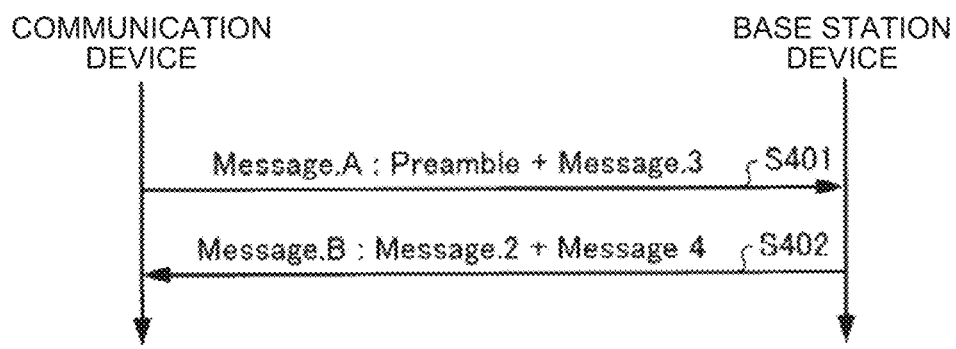
FIG. 13 is a sequence diagram illustrating a 2-step RACH of NR according to the present disclosure.

Next, the 2-step RACH of NR will be described. FIG. 13 is a sequence diagram illustrating the 2-step RACH of NR according to the present disclosure. The 2-step RACH procedure is constituted by two steps of Message.A (Step S401) and Message.B (Step S402).

FIG. 13 illustrates a case where Message.A includes Message.1 (Preamble) and Message.3 of conventional 4-STEP RACH, and Message.B includes Message.2 and Message.4 of conventional 4-STEP RACH as an example.

In addition, as an example, Message.A includes PRACH (preamble) and PUSCH, and Message.B includes PDSCH. With the 2-step random access procedure, the random access procedure can be completed with a lower delay than the conventional 4-STEP random access procedure.

The preamble and PUSCH included in Message.A may be set to be linked with the respective transmission resources or may be set as independent resources. In the case where the transmission resources are set to be linked, the transmission resource of PUSCH that can be determined uniquely or determined as a plurality of candidates, for example, when the transmission resource of the preamble has been determined.

As an example, time and frequency offsets between the Preamble of the PRACH occasion and the PUSCH occasion are defined by one value. In addition, as another example, time and frequency offsets between the Preamble of the PRACH occasion and the PUSCH occasion are defined as different values for each preamble.

The offset value may be determined according to specifications, or may be quasi-statically set by the base station device. As an example of the time and frequency offset values, a predetermined frequency is used, for example. For example, in the unlicensed band (5 GHz band, band 45), a value of a time offset can be set to 0 or a value close to 0.

As a result, it is possible to omit listen before talk (LBT) before PUSCH transmission. On the other hand, in the case of being set as independent resources, the transmission resource of each of the Preamble and PUSCH may be determined by the specifications, the base station device may quasi-statically set the resources, or the resources may be determined based on other information.

Examples of the other information include slot format information (slot format indicator and the like), band width part (BWP) information, Preamble transmission resource information, a slot index, a resource block index, and the like.

In addition, in the case of being set as independent resources, the base station may be notified of the link between the Preamble and PUSCH constituting one Message.A by a PUSCH payload or UCI included in the PUSCH. In addition, the base station may be notified of the link between the Preamble and PUSCH constituting one Message.A by a PUSCH transmission physical parameter (for example, a PUSCH scramble sequence, DMRS sequence and/or pattern, or a PUSCH transmission antenna port).

In addition, a method of setting the transmission resources of the Preamble and PUSCH may be switched between the case of setting to be linked with each other and the case of setting as independent resources. For example, the case of setting as independent resources may be applied in a license band, and the case where transmission resources are set to be linked may be applied in an unlicensed band.

Here, when the base station device is a satellite station, a propagation delay becomes extremely large as compared with the terrestrial network because the radio wave propagation distance is long. The propagation delay is approximately 41.75 ms for a low earth orbit satellite and 541.14 ms for a geostationary earth orbit satellite. It is considered that this propagation delay causes a problem in PRACH transmission and reception at the time of initial access in the communication system 1.

One of the purposes of PRACH transmission and reception is to calculate the propagation delay between the base station device and the communication device 50 and establish uplink synchronization. When the propagation delay is large, a reception timing of transmitted PRACH is likely to greatly deviate in excess of an expected PRACH reception slot in the base station device.

Figure 14:
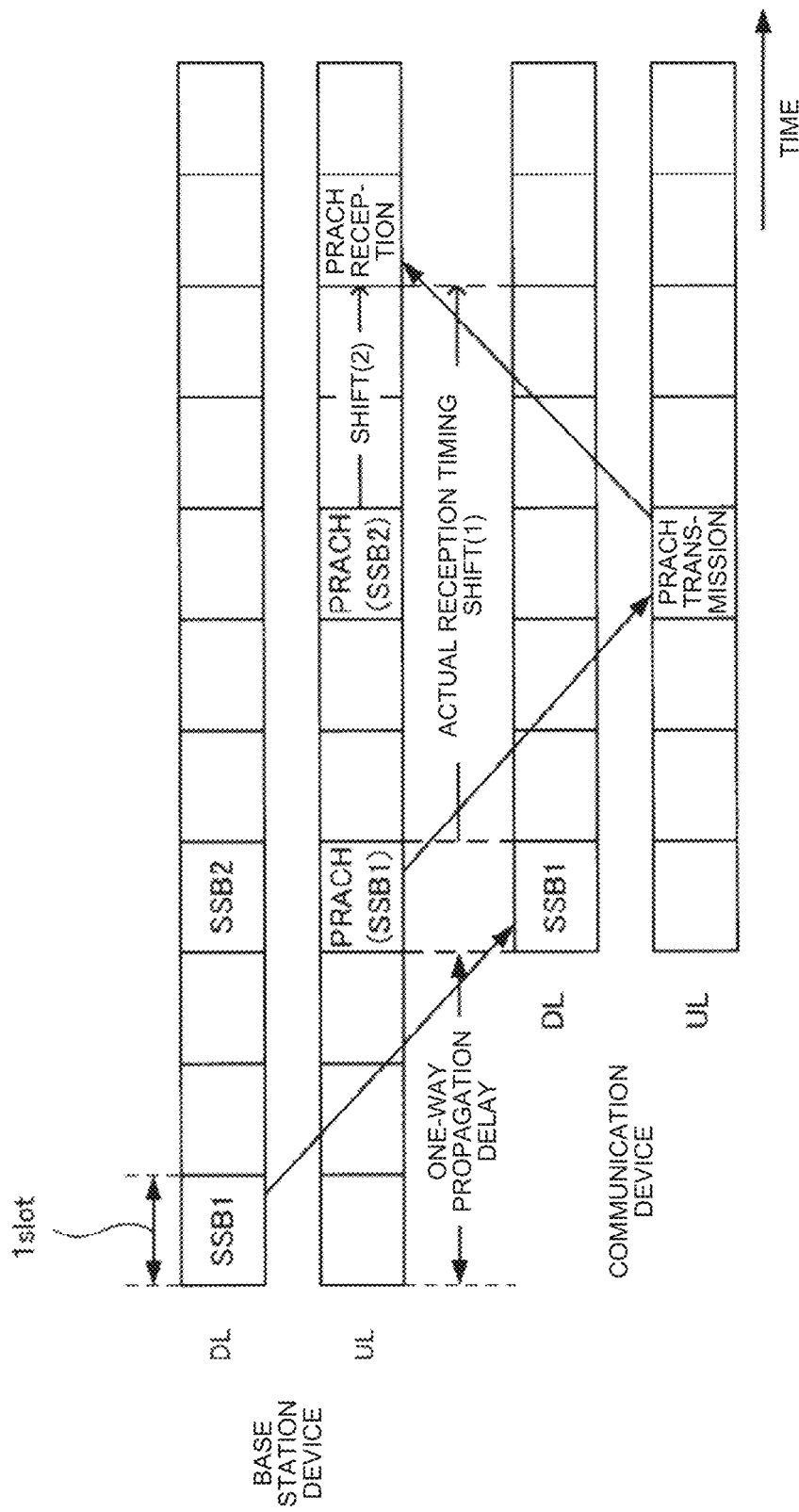
FIG. 14 is an explanatory diagram of a problem caused by a propagation delay according to the present disclosure.

In this case, the base station device does not sometimes know any PRACH reception timing from which the deviation occurs. FIG. 14 is an explanatory diagram of the problem caused by the propagation delay according to the present disclosure. DL illustrated in FIG. 14 is a downlink slot used for transmission and reception of a synchronization signal. UL is an uplink slot used for transmission and reception of PRACH.

In addition, SSB1 and SSB2 illustrated in FIG. 14 are synchronization signals transmitted from the base station device. Here, the synchronization signal is a synchronization signal (SS), an SS block having one or a plurality of SSs, or an SS block set having one or a plurality of SS blocks transmitted from the base station device.

In addition, the synchronization signal also includes a physical broadcast channel (PBCH) for transmission of MIB and SIB. In addition, in addition to the above, the synchronization signal also includes a signal that can serve as a reference signal. Note that the above SS Block may be referred to as an SS/PBCH block.

One or a plurality of the above synchronization signals are transmitted from the base station device. Here, the plurality includes the synchronization signals having different or the same features. Examples of the features of the synchronization signal include different resources, different sequences, different beams, and different reference signal ports.

In addition, PRACH (SSB1) illustrated in FIG. 14 is an uplink slot on the base station device side in which PRACH transmitted from the communication device 50 that has received SSB1 is assumed to be stored when there is no propagation delay.

The communication device 50 uses a PRACH resource to transmit PRACH to the base station device. The PRACH resource is a resource with which the communication device 50 can transmit the PRACH. The PRACH resource may be set to be linked with the synchronization signal, or may be set independently of the PRACH resource. The PRACH here corresponds to the random access preamble transmitted in Step S201 illustrated in FIG. 11.

In addition, PRACH (SSB2) is an uplink slot on the base station device side in which PRACH transmitted from the communication device 50 that has received SSB2 is assumed to be stored when there is no propagation delay.

The communication device 50 receives SSB1 substantially at the same time as the SSB1 is transmitted from the base station device when there is no propagation delay, and transmits PRACH to the base station device after a lapse of a predetermined time (for example, three slots from the reception of SSB1). Therefore, when there is no propagation delay, the base station device stores the PRACH corresponding to the SSB1 in PRACH (SSB1) illustrated in FIG. 14.

However, there may be a case where a one-way propagation delay corresponding to three slots occurs from the transmission of SSB1 by the base station device to the reception of SSB1 by the communication device 50, for example, as illustrated in FIG. 14. In such a case, if the base station device transmits PRACH to the base station device after a lapse of a predetermined time from the reception of SSB1 by the communication device 50 (for example, three slots from the reception of SSB1), the propagation delay also occurs here, and thus, the PRACH is received at the sixth slot from PRACH (SSB1).

At this time, the base station device sometimes receives PRACH corresponding to SSB2 transmitted before SSB1 illustrated in FIG. 14 on PRACH (SS2B) in the case of alternately transmitting SSB1 and SSB2.

In such a case, a shift between the PRACH (SSB1) that is the original reception timing of the PRACH corresponding to SSB1 illustrated in FIG. 14 and the PRACH reception that is the timing when the PRACH is actually received is an actual reception timing shift (1) illustrated in the same drawing.

However, the base station device is likely to erroneously determine that the PRACH received this time is PRACH corresponding to SSB2, and misunderstood a shift (2), which is the time from the PRACH (SSB2) to the PRACH reception illustrated in the same drawing as the shift of the reception timing caused by the propagation delay.

In addition, there also occurs a case where is it difficult for the base station device to receive PRACH if the reception timing significantly shifts from the original reception timing in the case of TDD or in a case where there is a half-duplex problem (case where the base station device is not capable of operating DL and UL simultaneously).

Therefore, the communication system 1 requires a means for allowing the base station device to receive PRACH and calculate a propagation delay amount normally when the reception timing of PRACH exceeds a slot for the expected slot because the propagation delay is great. Therefore, first to third communication methods described below are proposed in the present disclosure as countermeasures when the propagation delay is great.

<2-7. First Communication Method>

Figure 15:
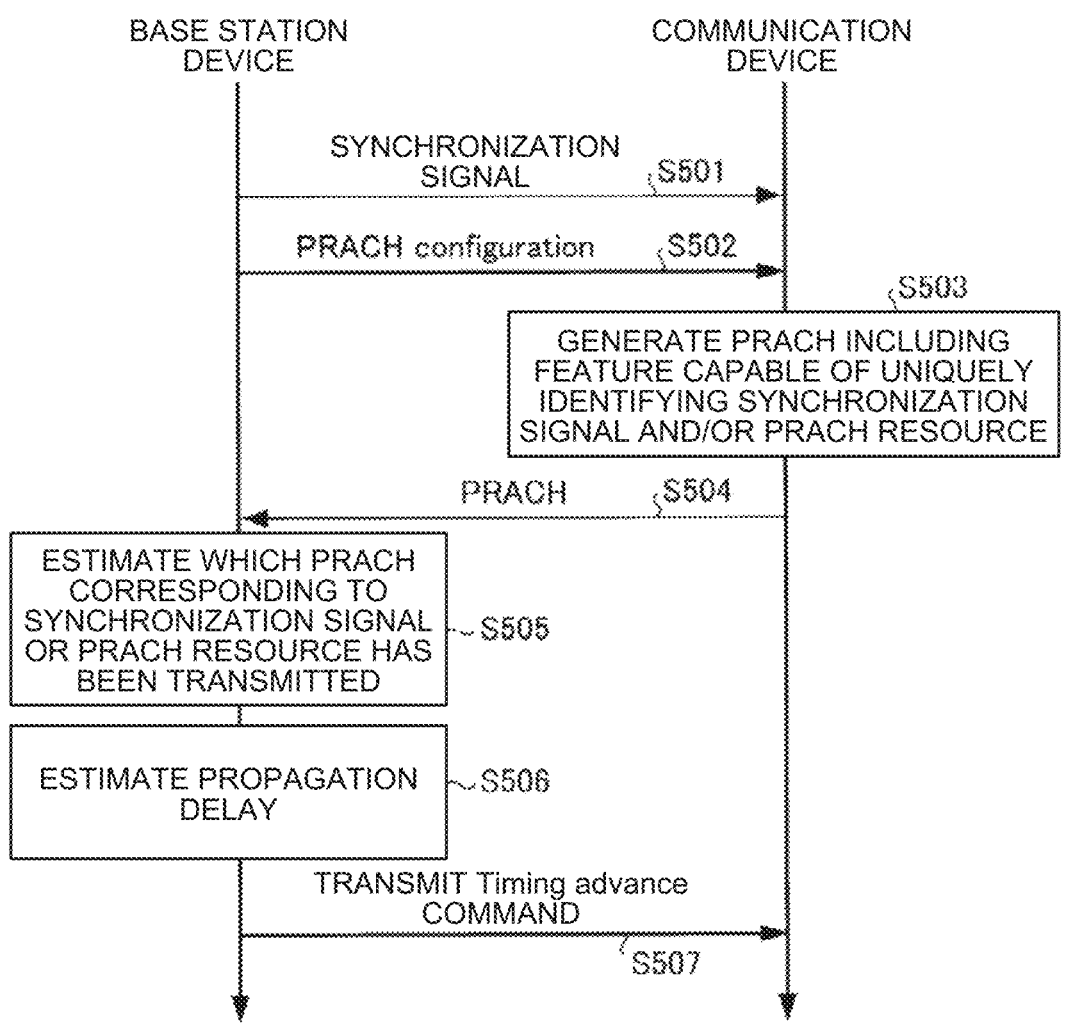
FIG. 15 is a sequence diagram illustrating a first communication method according to the present disclosure.

FIG. 15 is a sequence diagram illustrating the first communication method according to the present disclosure. As illustrated in FIG. 15, the base station device (for example, the transmission processor 212 of the non-terrestrial station 20) transmits a synchronization signal (Step S501) and transmits a PRACH configuration (Step S502).

When receiving the synchronization signal by the reception processor 511 (receiver) in the communication device 50, the control unit 55 functions as a generator that generates PRACH, and generates PRACH including a feature that can uniquely identify the synchronization signal and/or a PRACH resource (Step S503).

Note that the uniquely identifiable feature herein is a feature that can uniquely identify that the received PRACH is PRACH corresponding to any previously transmitted synchronization signal when the base station device receives the PRACH from the communication device 50.

Examples of the uniquely identifiable feature include at least one of a resource, a sequence, and a reference signal port differing for each synchronization signal. In addition, examples of the uniquely identifiable feature include at least any one of a preamble sequence, a demodulation reference signal (DMRS) sequence, a scramble sequence, an interleave sequence, and a message differing for each PRACH.

The transmission processor 512 (transmitter) of the communication device 50 transmits PRACH generated by a generator to the base station device (Step S504). Specifically, the communication device 50 transmits the PRACH by the above-described source or sequence or the like such that the base station device can uniquely identify the corresponding synchronization signal and/or PRACH resource. The base station device (for example, the reception processor 211 of the non-terrestrial station 20) receives PRACH from the communication device 50 that has received the synchronization signal in excess of the expected reception resources.

At this time, the base station device receives the PRACH including the feature that can uniquely identify the synchronization signal and/or the PRACH resource. As a result, the base station device can estimate synchronization signal or PRACH resource to which the transmitted PRACH corresponds, based on the received PRACH (Step S505).

Then, the control unit of the base station device (for example, the control unit 23 of the non-terrestrial station 20) functions as a calculator that calculates a propagation delay of the synchronization signal and PRACH, and calculates the propagation delay. At this time, the control unit of the base station device calculates and estimates the propagation delay based on, for example, a transmission timing of the synchronization signal and a reception timing of the PRACH (Step S506). Thereafter, the base station device transmits a Timing advance command to the communication device 50 which has transmitted the PRACH (Step S507).

In this manner, the communication device 50 transmits the PRACH including the feature capable of uniquely specifying the synchronization signal and/or the PRACH resource to the base station device in the first communication method. Therefore, the base station device can estimate synchronization signal and/or PRACH resource to which the PRACH received from the communication device 50 corresponds. As a result, the base station device can calculate the propagation delay more accurately. Therefore, the communication system 1 can further improve the quality between radio links.

The receiver of the communication device 50 may be configured to receive feature information indicating the feature, capable of uniquely identifying the synchronization signal and/or the PRACH resource, from the base station device, or may be configured to receive feature information from the base station device calculation formulas that can derive the above features.

In the case of such a configuration, the base station device transmits the above-described features and calculation formulas from which the features can be derived to the communication device 50 by MIB, SIB, RRC, and signaling, for example. As a result, the communication device 50 can derive a feature amount from the SS block index, for example. Even with such a configuration, the communication device 50 can generate PRACH including the feature that can uniquely identify the synchronization signal and/or the PRACH resource and transmit the PRACH to the base station device.

<2-8. Second Communication Method>

Figure 16:
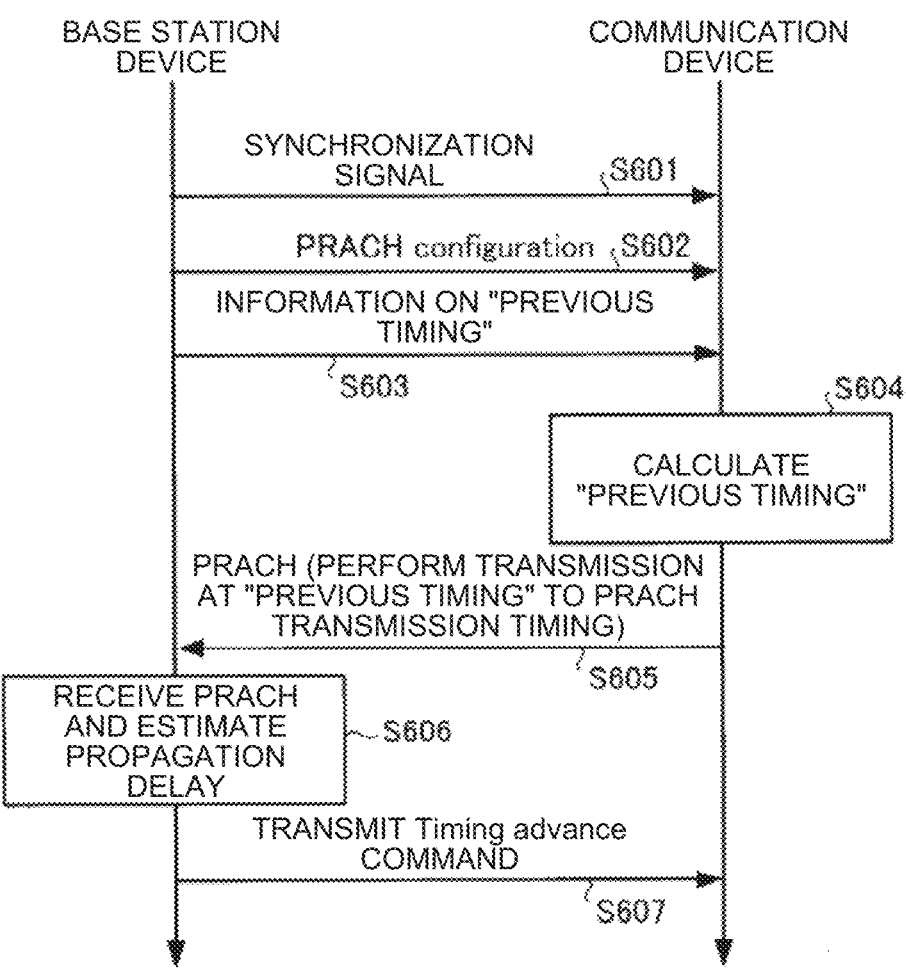
FIG. 16 is a sequence diagram illustrating a second communication method according to the present disclosure.

FIG. 16 is a sequence diagram illustrating the second communication method according to the present disclosure. As illustrated in FIG. 16, the base station device (for example, the transmission processor 212 of the non-terrestrial station 20) transmits a synchronization signal (Step S601) and transmits a PRACH configuration. (Step S602).

In addition, the base station device transmits information on "previous timing" (Step S603). The "previous timing" herein is a previous timing to a transmission timing of PRACH defined by the PRACH resource.

The base station device transmits, for example, information indicating the time from the reception of the synchronization signal to the start of the PRACH transmission, or information indicating the time to start the transmission of the current PRACH prior to the transmission timing of PRACH to be originally transmitted to the communication device 50 to be notified. At this time, a unit of the time notified from the base station device to the communication device 50 can employ, for example, the number of symbols, the number of slots, the number of subframes, the number of frames, milliseconds, or the like.

As the information on the "previous timing", the base station device can also transmit information, such as position information of the base station device, movement trajectory information, movement speed information, altitude information, and transmission time information of the synchronization signal transmitted from the base station device, to the communication device 50.

In the communication device 50, the control unit 55 functions as the calculator that calculates the "previous timing", and calculates the "previous timing" for transmitting PRACH based on the information on the "previous timing" received from the base station device (Step S604).

The communication device 50 calculates the "previous timing" based on at least any one of, for example, the position information of the base station device and/or the communication device 50, the movement trajectory information, the movement speed information, and the altitude information.

In addition, the communication device 50 may calculate the "previous timing" based on the transmission time information of the synchronization signal transmitted from the base station device and reception time information regarding reception of the synchronization signal. In addition, the communication device 50 may receive a calculation formula capable of deriving the "previous timing", and may derive the "previous timing" using the received calculation formula.

In such a configuration, the base station device may transmit an index corresponding to the calculation formula to the communication device 50. For example, the base station device transmits the index to the communication device 50 with Index #1 representing Calculation Formula #1 and Index #2 representing Calculation Formula #2.

In addition, the communication device 50 may receive timing information indicating the "previous timing" from the base station device. In such a configuration, the base station device calculates the "previous timing" by a method similar to the method for the communication device 50 to calculate the "previous timing", and transmits the calculated "previous timing" to the communication device 50.

Note that the base station device can notify the communication device 50 of the "previous timing" and the calculation formula from which the "previous timing" can be derived, for example, by MIB, SIB, RRC, and signaling.

The communication device 50 transmits PRACH at "the previous timing" to the original PRACH transmission timing (Step S605). The base station device receives the PRACH, adds a time offset for the "previous timing" to the reception timing of the PRACH to calculate the propagation delay, thereby estimating the propagation delay (Step S606).

In this manner, the base station device can receive PRACH at the original reception timing since the PRACH is transmitted from the communication device 50 at the "previous timing" to the original PRACH transmission timing even if there is the propagation delay.

As a result, the base station device can calculate the propagation delay more accurately. Thereafter, the base station device transmits a Timing advance command to the communication device 50 which has transmitted the PRACH (Step S607).

In this manner, the base station device can receive the PRACH at the original reception timing by estimating the propagation delay time in advance and shifting the PRACH transmission timing forward in the second communication method.

Note that the control unit of the base station device (for example, the control unit 23 of the non-terrestrial station 20) can also function as a calculator that calculates a time offset. For example, the control unit of the base station calculates the time offset by calculating the "previous timing" by a method similar to the method of calculating the "previous timing" by the communication device 50 described above.

In addition, the base station device can also transmit the calculated time offset to the communication device 50. In such a case, the transmitter of the base station device (transmission processor 212 of the non-terrestrial station 20) functions as a notification unit that notifies the communication device 50 of the time offset.

<2-9. Third Communication Method>

In the third communication method, the transmitter of the communication device 50 (for example, the transmission processor 512) transmits PRACH to the base station device using a band dedicated to PRACH transmission or a slot dedicated to PRACH transmission. In addition, the receiver of the base station device (for example, the reception processor 211 of the non-terrestrial station 20) receives the PRACH from the communication device 50 using a band dedicated to PRACH reception or a slot dedicated to PRACH reception.

The band dedicated to PRACH transmission is a band dedicated to PRACH transmission. The band dedicated to PRACH reception is a band dedicated to PRACH reception. Hereinafter, the band dedicated to PRACH transmission and the band dedicated to PRACH reception may be collectively referred to as PRACH transmission/reception-dedicated bands.

The PRACH transmission/reception-dedicated band may be configured as a PRACH-dedicated bandwidth part, a PRACH-dedicated resource block, a PRACH-dedicated component carrier, or the like. In addition, the PRACH transmission/reception-dedicated band may be configured as a PRACH-dedicated resource block.

The PRACH transmission-dedicated slot is a dedicated slot for the purpose of PRACH transmission. The PRACH reception-dedicated slot is a dedicated slot for the purpose of PRACH reception. Hereinafter, the slot dedicated to PRACH transmission and the slot dedicated to PRACH reception may be collectively referred to as PRACH transmission/reception-dedicated slots.

The PRACH transmission/reception-dedicated slot is a slot for transmission/reception of PRACH, for example, a combination of a plurality of symbols, a plurality of slots, a plurality of subframes, and the like. The PRACH transmission/reception-dedicated slot may be defined as another slot format, or may be defined as a combination pattern of a plurality of symbols, slots, and subframes.

A boundary exists in both the PRACH transmission/reception-dedicated band and the PRACH transmission/reception-dedicated slot. Therefore, for example, the boundary of the PRACH transmission/reception-dedicated band or the PRACH transmission/reception slot is set as the start time of an SSB transmission slot in the present disclosure.

In addition, for example, the boundary of the PRACH transmission/reception-dedicated band or the PRACH transmission/reception-dedicated slot can be also set as the time obtained by adding a time Offset to the start time of the SSB transmission slot. The time Offset is represented by a symbol, a slot, a subframe, an absolute time amount, or the like.

FIG. 17 is an explanatory diagram of the third communication method according to the present disclosure. UL indicated by the thick rectangle in FIG. 17 is the PRACH transmission/reception-dedicated band or the PRACH transmission/reception-dedicated slot. In the example illustrated in FIG. 17, the boundary of the PRACH transmission/reception-dedicated band or the PRACH transmission/reception-dedicated slot is set as the start time of the SSB transmission slot. In addition, the base station device transmits two SSB1 and SSB2, and has the PRACH transmission/reception-dedicated band or the PRACH transmission/reception-dedicated slot corresponding to each SSB.

The communication device 50 that has received SSB1 transmits PRACH using a resource of the PRACH (SSB1). It is assumed that the communication device 50 transmits PRACH, for example, after a lapse of a predetermined time $T_{PRACH}$ from the start of a DL slot that has received SSB1. $T_{PRACH}$ may be notified in advance from the base station device as time information by SIB or the like, or may be determined as the specification in advance.

The base station device receives the transmitted PRACH and calculates the propagation delay amount. At this time, the base station device receives PRACH corresponding to SSB1 and stores the PRACH in the PRACH (SSB1) that is a UL slot dedicated to SSB1, and receives PRACH corresponding to SSB2 and stores the PRACH in PRACH (SSB2) which is a UL slot dedicated to SSB2.

Therefore, for example, when the base station device receives the PRACH corresponding to SSB1, the PRACH can be prevented from being erroneously determined as the PRACH corresponding to SSB2. As a result, the base station device can calculate an accurate reciprocating delay amount from the transmission of the synchronization signal to the reception of PRACH.

In the case of the example illustrated in FIG. 17, the reciprocating propagation delay amount can be calculated as follows.

(Reciprocating Propagation Delay)=(PRACH Reception Start Timing)−(SSB1 Transmission Start Timing)−$T_{PRACH}$ In addition, the base station device can also set the boundary of the PRACH transmission/reception-dedicated band or the PRACH transmission/reception-dedicated slot as the time obtained by adding the time Offset to the start time of the SSB transmission slot as described above.

As a result, the base station device can calculate a more accurate reciprocating delay amount from the transmission of the synchronization signal to the reception of PRACH by preventing two PRACHs that are received with a time difference from being stored in one PRACH (SSB1).

<2-10. Effects>

The communication device includes the receiver and the transmitter. The receiver receives the synchronization signal transmitted from the base station device. The transmitter transmits PRACH including the feature that can uniquely identify the synchronization signal received by the receiver and/or the PRACH resource to the base station device As a result, the base station device can more accurately calculate the propagation delay by accurately discriminating transmitted synchronization signal to which the received PRACH corresponds. As a result, the communication device can further improve the quality between radio links.

In addition, the communication device includes the generator that generates PRACH including the above feature. As a result, the communication device can transmit PRACH including the feature that can uniquely identify the synchronization signal and/or the PRACH resource to the base station.

In addition, the above feature includes at least one of the resource, the sequence, the beam, and the reference signal port differing for each synchronization signal. As a result, the communication device can cause the base station device to accurately discriminate synchronization signal to which the PRACH having the above feature corresponds.

In addition, the above feature includes at least any one of a preamble sequences, a demodulation reference signal sequence, a scramble sequence, an interleave sequence, and a message differing for each PRACH. As a result, the communication device can cause the base station device to accurately discriminate synchronization signal to which the PRACH having the above feature corresponds.

In addition, the receiver receives the feature information indicating the feature from the base station device. As a result, the communication device transmits the PRACH including the feature indicated by the feature information to the base station device, and thus, the base station device can reliably discriminate synchronization signal to which the PRACH corresponds.

In addition, the communication device includes the calculator that derives the feature. The receiver receives the calculation formula from which the feature can be derived from the base station device. As a result, the communication device can derive the feature that can uniquely identify the synchronization signal and/or the PRACH resource by using the received calculation formula.

With the communication method, the communication device receives the synchronization signal transmitted from the base station device, and transmits the PRACH including the feature that can uniquely identify the received synchronization signal and/or PRACH resource to the base station device. As a result, the base station device can more accurately calculate the propagation delay by accurately discriminating transmitted synchronization signal to which the received PRACH corresponds. As a result, the communication device can further improve the quality between radio links.

In addition, the communication device includes the receiver and the transmitter. The receiver receives the synchronization signal transmitted from the base station device. The transmitter transmits the PRACH to the base station device at the previous timing to the PRACH transmission timing defined by the PRACH resource. As a result, even if there is the propagation delay, the base station device can receive the PRACH at the original PRACH reception timing and calculate the propagation delay more accurately. As a result, the communication device can further improve the quality between radio links.

In addition, the communication device includes the calculator that calculates the previous timing. As a result, the communication device can calculate an accurate previous timing according to the propagation delay.

In addition, the calculator calculates the previous timing based on at least one of the position information, the movement trajectory information, the movement speed information, and the altitude information of the base station device and/or the communication device. As a result, the communication device can calculate a more accurate previous timing.

In addition, the calculator calculates the previous timing based on the transmission time information and the reception time information of the synchronization signal used for wireless communication with the base station device. As a result, the communication device can calculate the previous timing based on the actual propagation delay.

In addition, the receiver receives the calculation formula that can derive the previous timing from the base station device. As a result, the communication device can calculate an appropriate previous timing that differs for each base station device.

In addition, the receiver receives timing information indicating the previous timing from the base station device. As a result, the communication device can calculate an appropriate previous timing that differs for each base station device.

In addition, with the communication method, the communication device receives the synchronization signal transmitted from the base station device, and transmits PRACH to the base station device at the previous timing to the PRACH transmission timing specified by the PRACH resource. As a result, even if there is the propagation delay, the base station device can receive the PRACH at the original PRACH reception timing and calculate the propagation delay more accurately. As a result, the communication device can further improve the quality between radio links.

In addition, the communication device includes the receiver and the transmitter. The receiver receives the synchronization signal transmitted from the base station device. The transmitter transmits PRACH to the base station device using the band dedicated to PRACH transmission or the slot dedicated to PRACH transmission. As a result, the base station device uses the band or slot dedicated to PRACH corresponding to the transmitted synchronization signal to receive the PRACH corresponding to each synchronization signal, and thus, can calculate the propagation delay more accurately. As a result, the communication device can further improve the quality between radio links.

In addition, the transmitter transmits PRACH to the base station device after a predetermined time has elapsed since the reception of the synchronization signal by the receiver. As a result, the communication device shortens the predetermined time as much as possible, and thus, can cause the base station device to receive the PRACH to be transmitted at the original PRACH reception timing.

In addition, the receiver receives time information indicating the predetermined time from the base station device. As a result, the communication device can cause the base station device to receive the PRACH to be transmitted at the PRACH reception timing expected by the base station device.

In addition, with the communication method, the communication device receives the synchronization signal transmitted from the base station device, and transmits PRACH to the base station device using the band dedicated to PRACH transmission or the slot dedicated to PRACH transmission. As a result, the base station device uses the band or slot dedicated to PRACH corresponding to the transmitted synchronization signal to receive the PRACH corresponding to each synchronization signal, and thus, can calculate the propagation delay more accurately. As a result, the communication device can further improve the quality between radio links.

3. MODIFICATIONS

Each of the above-described embodiments is an example, and various modifications and applications are possible.

<3-1. Modification Regarding System Configuration>

In the present embodiment, the non-terrestrial station 20, the terrestrial station 30, and the relay station 40 support cellular communication schemes such as W-CDMA, cdma2000, LTE, and NR. However, the cellular communication schemes supported by the non-terrestrial station 20, the terrestrial station 30, and the relay station 40 are not limited to the above-described cellular communication schemes, and other cellular communication schemes, such as ultra-mobile broadband (UMB), can be supported. In addition, these devices can support other wireless communication schemes such as a short-range wireless communication scheme, a close proximity wireless communication scheme, or a wireless local area network (LAN) scheme, in addition to the cellular communication schemes.

In addition, in the above-described embodiment, the low earth orbit satellite constellation is formed by the plurality of non-terrestrial stations 20, but the satellite constellation formed by the plurality of non-terrestrial stations 20 is not limited to the low earth orbit satellite constellation. The satellite constellation formed by the plurality of non-terrestrial stations 20 may be a satellite constellation such as a medium earth orbit satellite constellation and a geostationary earth orbit satellite constellation.

In addition, for example, a single base station forms a single cell in the above-described embodiment. However, a plurality of base stations may cooperate to form a single cell, which can be appropriately changed.

<3-2. Other Modifications>

A control device that controls the management device 10, the non-terrestrial station 20, the terrestrial station 30, the relay station 40, or the communication device 50 of the present embodiment may be realized by a dedicated computer system or a general-purpose computer system.

For example, a communication program used for executing the above operations (for example, communication processing according to the first to third communication methods) is stored and delivered in a computer-readable recording medium such as an optical disk, a semiconductor memory, a magnetic tape, and a flexible disk. Then, for example, the control device is configured by installing the program in a computer and executing the above-described processing. At this time, the control device may be a device outside the management device 10, the non-terrestrial station 20, the terrestrial station 30, the relay station 40, or the communication device 50 (for example, a personal computer). In addition, the control device may be a device inside the non-terrestrial station 20, the terrestrial station 30, the relay station 40, or the communication device 50 (for example, the control unit 13, the control unit 23, the control unit 34, the control unit 44, or the control unit 55.).

Further, the above-described communication program can be stored in a disk device provided in a server device on a network such as the Internet in such a way to be downloaded to a computer. In addition, the above-described functions can be realized by cooperation between an operating system (OS) and application software. In this case, other parts than OS can be stored in a medium for delivery, or other parts than OS can be stored in the server device and downloaded to a computer.

In addition, among each process described in the above embodiments, all or a part of the processes described as being performed automatically may be manually performed or the processes described as being performed manually can be performed automatically by the known method. In addition, the processing procedures, specific names, and information including various data and parameters illustrated in the above documents and drawings can be arbitrarily changed unless otherwise specified. For example, various information illustrated in each drawing is not limited to the information illustrated.

In addition, each component of each device illustrated is a functional concept, and does not necessarily need to be physically configured as illustrated. That is, the specific form of distribution/integration of each device is not limited to those illustrated in the drawings, and all or a part thereof may be functionally or physically distributed/integrated into arbitrary units according to various loads and usage conditions.

In addition, the above-described respective embodiments can be appropriately combined within a range that does not contradict processing contents. In addition, the order of the steps illustrated in the flow charts or sequence diagrams of the above-described embodiments can be changed appropriately.

4. CONCLUSION

As described above, the communication device 50 receives the synchronization signal and the PRACH resource transmitted from the base station device according to one embodiment of the present disclosure. Then, the communication device 50 transmits PRACH having the feature capable of uniquely specifying the received synchronization signal and/or the PRACH resource to the base station device. As a result, the base station device can correctly determine the correspondence between the transmitted synchronization signal and PRACH resource and the received PRACH. As a result, the communication device 50 can further improve the quality between radio links.

Although the above description is given of the respective embodiments of the present disclosure, the technical scope of the present disclosure is not limited to the above-described respective embodiments as they are, and various modifications can be made without departing from the scope of the present disclosure. In addition, the components in different embodiments and modifications can be combined suitably.

In addition, the effects of the respective embodiments described in the present specification are merely illustrative and not limited to the illustration and additional effects may be present.

Note that the present technology can also have the following configurations.

(1)
A communication device comprising:
a receiver that receives synchronization signals transmitted from a base station device; and
a transmitter that transmits, to the base station device, PRACHs including features capable of uniquely identifying the synchronization signals received by the receiver and/or PRACH resources.

(2)
The communication device according to (1), further comprising
a generator that generates the PRACHs including the features.

(3)
The communication device according to (1) or (2), wherein
the features
include at least any one of a resource, a sequence, a beam, and a reference signal port differing for each of the synchronization signals.

(4)
The communication device according to any one of (1) to (3), wherein
the features
include at least any one of a preamble sequence, a demodulation reference signal sequence, a scramble sequence, an interleave sequence, and a message differing for each of the PRACHs.

(5)
The communication device according to any one of (1) to (4), wherein
the receiver
receives feature information indicating the features from the base station device.

(6)
The communication device according to any one of (1) to (5), comprising
a calculator that derives the features, wherein
the receiver receives a calculation formula which enables the features to be derived from the base station device.

(7)
A communication method executed by a communication device, comprising:
receiving a synchronization signal transmitted from a base station device; and
transmitting, to the base station device, a PRACH including a feature capable of uniquely identifying the received synchronization signal and/or a PRACH resource.

(8)
A communication device comprising:
a receiver that receives a synchronization signal transmitted from a base station device; and
a transmitter that transmits a PRACH to the base station device at a previous timing to a transmission timing of the PRACH specified by a PRACH resource.

(9)
The communication device according to (8), further comprising
a calculator that calculates the previous timing.
(10)
The communication device according to (9), wherein
the calculator
calculates the previous timing based on at least any one of position information, movement trajectory information, movement speed information, and altitude information of the base station device and/or the communication device.
(11)
The communication device according to (9) or (10), wherein
the calculator
calculates the previous timing based on transmission time information and reception time information of the synchronization signal.
(12)
The communication device according to any one of (9) to (11), wherein
the receiver
receives a calculation formula capable of deriving the previous timing from the base station device.
(13)
The communication device according to (8), wherein
the receiver
receives timing information indicating the previous timing from the base station device.
(14)
A communication method executed by a communication device, comprising:
receiving a synchronization signal transmitted from a base station device; and
transmitting a PRACH to the base station device at a previous timing to a transmission timing of the PRACH specified by a PRACH resource.
(15)
A communication device comprising:
a receiver that receives a synchronization signal transmitted from a base station device; and
a transmitter that transmits a PRACH to the base station device using a band dedicated to PRACH transmission or a slot dedicated to PRACH transmission.
(16)
The communication device according to (15), wherein
the transmitter
transmits the PRACH to the base station device after a predetermined time has elapsed since reception of the synchronization signal by the receiver.
(17)
The communication device according to (16), wherein
the receiver
receives time information indicating the predetermined time from the base station device.
(18)
A communication method executed by a communication device, comprising:
receiving a synchronization signal transmitted from a base station device; and
transmitting a PRACH to the base station device using a band dedicated to PRACH transmission or a slot dedicated to PRACH transmission.
(19)
A communication program for causing a computer provided in a communication device to function as:
a receiver that receives a synchronization signal transmitted from a base station device; and
a transmitter that transmits, to the base station device, a PRACH including a feature capable of uniquely identifying the synchronization signal received by the receiver and/or a PRACH resource.
(20)
A communication program for causing a computer provided in a communication device to function as:
a receiver that receives a synchronization signal transmitted from a base station device; and
a transmitter that transmits a PRACH to the base station device at a previous timing to a transmission timing of the PRACH specified by a PRACH resource.
(21)
A communication program for causing a computer provided in a communication device to function as:
a receiver that receives a synchronization signal transmitted from a base station device; and
a transmitter that transmits a PRACH to the base station device using a band dedicated to PRACH transmission or a slot dedicated to PRACH transmission.
(22)
A base station device including:
a transmitter that transmits a synchronization signal; and
a receiver that receives a PRACH transmitted from a communication device that has received the synchronization signal, in excess of an expected reception resource.
(23)
The base station device according to (22), in which
the receiver receives the PRACH including a feature capable of uniquely identifying the synchronization signal and/or a PRACH resource from the communication device.
(24)
The base station device according to (22) or (23), further including
a calculator that calculates a propagation delay time of the synchronization signal and the PRACH based on a reception timing of the PRACH by the receiver.
(25)
A communication method executed by a base station device, including:
transmitting a synchronization signal; and
receiving a PRACH transmitted from a communication device that has received a synchronization signal in excess of an expected reception resource.
(26)
A communication program for causing a computer provided in a base station device to function as:
a transmitter that transmits a synchronization signal; and
a receiver that receives a PRACH transmitted from a communication device that has received a synchronization signal in excess of an expected reception resource.
(27)
A base station device including:
a transmitter that transmits a synchronization signal;
a receiver that receives a PRACH transmitted by the communication device at a previous timing to a transmission timing of a PRACH specified by a PRACH resource; and a calculator that calculates a propagation delay time of the synchronization signal and the PRACH by adding a time offset corresponding to the previous timing to a reception timing of the PRACH by the receiver.

(28) The base station device according to (27), in which the calculator calculates the time offset.

(29) The base station device according to (27) or (28), further including
a notification unit that notifies the communication device of the time offset.

(30) A communication method executed by a base station device, including:
transmitting a synchronization signal;
receiving a PRACH transmitted by the communication device at a previous timing to a transmission timing of a PRACH specified by a PRACH resource; and
calculating a propagation delay time of the synchronization signal and the PRACH by adding a time offset corresponding to the previous timing to a reception timing of the PRACH.

(31) A communication program for causing a computer provided in a base station device to function as:
a transmitter that transmits a synchronization signal;
a receiver that receives a PRACH transmitted by the communication device at a previous timing to a transmission timing of a PRACH specified by a PRACH resource; and
a calculator that calculates a propagation delay time of the synchronization signal and the PRACH by adding a time offset corresponding to the previous timing to a reception timing of the PRACH by the receiver.

(32) A base station device including:
a transmitter that transmits a synchronization signal; and
a receiver that receives a PRACH from the communication device using a band dedicated to PRACH reception or a slot dedicated to PRACH reception.

(33) A communication method executed by a base station device, including:
transmitting a synchronization signal; and
receiving a PRACH from the communication device using a band dedicated to PRACH reception or a slot dedicated to PRACH reception.

(34) A communication program for causing a computer provided in a base station device to function as:
a transmitter that transmits a synchronization signal; and
a receiver that receives a PRACH from the communication device using a band dedicated to PRACH reception or a slot dedicated to PRACH reception.

REFERENCE SIGNS LIST

20 NON-TERRESTRIAL STATION
30 TERRESTRIAL STATION
50 COMMUNICATION DEVICE
55 CONTROL UNIT

The invention claimed is:

1. A communication device comprising:
circuitry configured to:
receive, from a non-terrestrial station device, information indicating a previous timing,
based on the information indicating a previous timing, transmit a physical random access channel (PRACH) to a non-terrestrial station device at a time previous to a transmission time allocated to the PRACH, and
wherein the time previous to the PRACH preamble transmission is calculated based on position information of the communication device and/or movement trajectory information.

2. The communication device of claim 1, wherein the non-terrestrial station device is an aircraft station or a satellite station or a relay station that relays satellite communication.

3. The communication device of claim 1, wherein the circuitry transmits the PRACH to the non-terrestrial station device using a band dedicated to the PRACH transmission or a slot dedicated to the PRACH transmission.

4. The communication device of claim 1, wherein the circuitry transmits the PRACH to the non-terrestrial station device after a predetermined time has elapsed since receiving a synchronization signal from the non-terrestrial station device.

5. The communication device of claim 1, wherein
the circuitry is configured to receive synchronization signals transmitted from the non-terrestrial station device, and
the PRACH includes at least one feature capable of identifying:
the PRACH resource, and
a preamble sequence.

6. The communication device of claim 5, wherein the PRACH is configured using a Zadoff-Chu sequence.

7. A method performed by a communication device, the method comprising:
receiving, from a non-terrestrial station device, information indicating a previous timing,
based on the information indicating a previous timing, transmitting a physical random access channel (PRACH) to the non-terrestrial station device at a time previous to a transmission time allocated to the PRACH, and
wherein the method further comprises calculating the time previous to the transmission time allocated to the PRACH based on position information of the communication device and/or movement trajectory information.

8. The method of claim 7, further comprising:
receiving synchronization signals transmitted from the non-terrestrial station device, and
wherein the PRACH includes the feature capable of identifying: the PRACH resource, and a preamble sequence.

9. The method of claim 8, wherein the PRACH is configured using a Zadoff-Chu sequence.

10. The method of claim 9, wherein the non-terrestrial station device is an aircraft station or a satellite station or a relay station that relays satellite communication.

11. A non-terrestrial station device comprising:
circuitry configured to:
transmit, to a terrestrial communication device, information indicating a previous timing, based on the information indicating a previous timing, receive a physical random access channel (PRACH) from the terrestrial communication device at a time previous to a transmission time allocated to the PRACH, and
wherein the time previous to the transmission time allocated to the PRACH is calculated based on position information of the terrestrial communication device and/or movement trajectory information.

12. The non-terrestrial station device of claim 11, wherein the circuitry is further configured to transmit synchronization signals to the terrestrial communication device, and
the PRACH includes at least one feature capable of identifying the PRACH resource, and a preamble sequence.

13. The non-terrestrial station device of claim 12, wherein the PRACH is configured using a Zadoff-Chu sequence.

14. A method performed by a non-terrestrial station device, the method comprising:
transmitting, to a terrestrial communication device, information indicating a previous timing,
based on the information indicating a previous timing, receiving a physical random access channel (PRACH) from the terrestrial communication device at a time previous to a transmission time allocated to the PRACH, and
wherein the time previous to the transmission time allocated to the PRACH is calculated based on position information of the terrestrial communication device and/or movement trajectory information.

15. The method of claim 14, further comprising:
transmitting synchronization signals to the terrestrial communication device, and
the PRACH includes the feature capable of identifying: the PRACH resource, and a preamble sequence.

16. The method of claim 14, wherein the PRACH is configured using a Zadoff-Chu sequence.

17. A non-transitory computer product containing instructions to cause a non-terrestrial station device to perform a method, the method comprising:
transmitting, to a terrestrial communication device, information indicating the previous timing,
based on the information indicating a previous timing, receiving a physical random access channel (PRACH) from a terrestrial communication device at a time previous to a transmission time allocated to the PRACH, and
wherein the time previous to the transmission time allocated to the PRACH is calculated based on position information of the terrestrial communication device and/or movement trajectory information.

18. A non-transitory computer product containing instructions to cause a terrestrial station device to perform a method, the method comprising:
receiving, from a non-terrestrial station device, information indicating a previous timing,
based on the information indicating a previous timing, transmitting a physical random access channel (PRACH) to the non-terrestrial station device at a time previous to a transmission time allocated to the PRACH, and
wherein the method further comprises calculating the time previous to the transmission time allocated to the PRACH based on position information of the communication device and/or movement trajectory information.

* * * * *